United States Patent [19]

Hirao et al.

[11] Patent Number: 5,636,909
[45] Date of Patent: Jun. 10, 1997

[54] TRACTION CONTROL SYSTEM FOR VEHICLE

[75] Inventors: Tomoyuki Hirao; Fumio Kageyama, both of Hiroshima-ken, Japan

[73] Assignee: Mazda Motor Corporation, Hiroshima-ken, Japan

[21] Appl. No.: 351,128

[22] Filed: Nov. 30, 1994

[30] Foreign Application Priority Data

| Dec. 1, 1993 | [JP] | Japan | 5-301721 |
| Jan. 31, 1994 | [JP] | Japan | 6-028888 |
| Apr. 18, 1994 | [JP] | Japan | 6-078550 |

[51] Int. Cl.$^6$ .................................................. E60T 8/34
[52] U.S. Cl. ........................ 303/140; 364/426.033; 364/426.029; 303/113.2
[58] Field of Search .................................. 303/139, 140, 303/144, 146, 147, 165, 113.2; 364/426.03

[56] References Cited

U.S. PATENT DOCUMENTS

| 5,001,636 | 3/1991 | Shiraishi et al. . |
| 5,024,285 | 6/1991 | Fujita .................... 303/140 X |
| 5,291,408 | 3/1994 | Thatcher . |
| 5,328,256 | 7/1994 | Ohta et al. .............. 303/140 |
| 5,333,058 | 7/1994 | Shiraishi et al. ........ 303/140 X |

FOREIGN PATENT DOCUMENTS

| 0488052 | 6/1992 | European Pat. Off. . |
| 0492782 | 7/1992 | European Pat. Off. . |
| 0522615 | 1/1993 | European Pat. Off. . |
| 4403160 | 8/1994 | Germany . |
| 194029 | 4/1989 | Japan . |
| 3157255 | 7/1991 | Japan . |

*Primary Examiner*—Lee W. Young
*Attorney, Agent, or Firm*—Sixbey, Friedman, Leedom & Ferguson, P.C.; Gerald J. Ferguson, Jr.; Donald R. Studebaker

[57] ABSTRACT

A traction control system for a vehicle reduces the rate of slip of driving wheels of the vehicle by reducing the traction force transmitted to the road surface from the driving wheels when the driving wheels slip. Whether the vehicle is making a turn is judged, and whether the vehicle is in an instable state which occurs when the vehicle is making a turn. The traction force is reduced by a higher rate when the driving wheels slip while the vehicle is making a turn than when the driving wheels slip while the vehicle is running straight, and the traction force is reduced by a higher rate when the driving wheels slip while the vehicle is in an instable state than when the driving wheels slip while the vehicle is making a turn.

20 Claims, 13 Drawing Sheets

TRACTION CONTROL SYSTEM FOR VEHICLE

BACKGROUND OF THE INVENTION

1. Field of the Invention

This invention relates to a traction control system for a vehicle which reduces the torque transmitted to the road surface from the driving wheels of the vehicle in order to suppress slip of the driving wheels.

2. Description of the Prior Art

There has been known a traction control system for a vehicle which reduces the torque transmitted to the road surface from the driving wheels of the vehicle in order to suppress slip of the driving wheels.

In the traction control system, the rate of slip of the driving wheels is detected and the driving force (torque transmitted to the road surface from the driving wheels) is reduced by lowering the engine output and/or applying brakes to the driving wheels so that the rate of slip of the driving wheels converges on a target rate of slip which is determined according to the friction coefficient of the road surface, thereby preventing deterioration in the starting performance or accelerating performance due to slip of the driving wheels caused by an excessive driving torque during starting or acceleration.

When the driving wheels slip during turning, it becomes difficult for the vehicle to make a stable turn. Especially it becomes more difficult for the vehicle to make a stable turn when the vehicle comes into an oversteering state in the case of a rear-drive vehicle and into an understeering state in the case of frontdrive vehicle.

Thus there has been proposed a traction control system in which when a rear-drive vehicle is in an oversteering state, the target rate of slip is reduced so that the traction control is initiated earlier, thereby ensuring stability during a turn. See, for instance, Japanese Unexamined Patent Publication No. 3(1991)-157255.

However, conventionally, whether the vehicle is in an instable state during turning, e.g., in an oversteering state (in the case of a rear-drive vehicle) or in an understeering state (in the case of a front-drive vehicle) cannot be constantly detected precisely and accordingly, when it is misjudged that the vehicle is in an instable state and the traction control is initiated earlier in spite of the fact that the vehicle is actually in a stable state, the engine output is unnecessarily lowered or the braking force is unnecessarily increased.

For example, in one known method of judging whether the vehicle is in an oversteering state, it is judged that the vehicle is in an oversteering state when the difference between the actual yaw rate of the vehicle and a reference yaw rate (a yaw rate which is to act on the vehicle on the basis of the vehicle speed, the turning angle of the steering wheel and the like) is larger than a predetermined value. This method gives rise to the following problem. That is, if the actual yaw rate is detected by a known yaw rate sensor, the yaw rate sensor instantaneously detects a large yaw rate, for instance, when one of the driven wheels runs into a ditch or runs onto snow during straight running. As a result, it is misjudged that the vehicle is in an oversteering state and the target rate of slip can be reduced in vain.

In the case where the actual yaw rate is calculated on the basis of the difference in the wheel speed between the left and right driven wheels and the vehicle speed, a large wheel speed difference is detected, for instance, when one of the driven wheels runs into a ditch or runs onto snow during straight running and the calculated value of the yaw rate becomes large though the yaw rate is actually small. As a result, it is misjudged that the vehicle is in an oversteering state and the target rate of slip can be reduced in vain.

Accordingly it is preferred that the traction control system, in which whether the vehicle is in an oversteering state is determined on the basis of the difference between the actual yaw rate and the reference yaw rate and the target rate of slip is reduced when it is determined that the vehicle is in an oversteering state, be provided with a means for avoiding an unnecessary reduction of the driving force due to a misjudgment of the oversteering state.

Further when the actual yaw rate increases during turning and the vehicle comes to an oversteering state, the driver sometimes turns the steering wheel in the counter direction to prevent spin of the vehicle and the steering wheel can be returned to the neutral position. In such a case, since the traction control has been initiated with the target rate of slip set at a value corresponding to the oversteering state, the target rate of slip is changed to a value corresponding to the straight running state as soon as the steering wheel is returned to the neutral position and it is determined that the vehicle is running straight, whereby the traction force is quickly increased and the running stability of the vehicle deteriorates.

SUMMARY OF THE INVENTION

In view of the foregoing observations and description, the primary object of the present invention is to provide a traction control system for a vehicle which ensures a better running performance and a better running stability by reducing the driving force according to the state of stability of the vehicle such as whether the vehicle is running straight, whether the vehicle is making a turn, whether the vehicle is in an oversteering state or whether the vehicle is in an understeering state.

Another object of the present invention is to provide a traction control system for a vehicle in which an unnecessary reduction of the driving force due to misjudgment of the instable state of the vehicle, e.g., that the vehicle is in an oversteering state or in an understeering state, can be avoided.

Still another object of the present invention is to provide a traction control system for a vehicle in which an abrupt increase in the traction force can be avoided when the steering wheel is turned in the counter direction in an instable state of the vehicle, whereby the running stability during turning can be improved.

In accordance with a first aspect of the present invention, there is provided a traction control system for a vehicle which reduces the rate of slip of driving wheels of the vehicle by reducing the driving force transmitted to the road surface from the driving wheels when the driving wheels slip, wherein the improvement comprises a turning state judging means which judges whether the vehicle is making a turn, an instable state judging means which judges whether the vehicle is in an instable state such as an oversteering state or an understeering state which occurs when the vehicle is making a turn, and a torque control means which reduces the driving force by a higher rate when the driving wheels slip while the vehicle is making a turn than when the driving wheels slip while the vehicle is running straight, and reduces the driving force by a higher rate when the driving wheels slip while the vehicle is in an instable state than when the driving wheels slip while the vehicle is making a turn.

In one embodiment, the traction control system further comprises a steering angle detecting means which detects the turning angle of the steering wheel, a reference yaw rate calculating means which calculates a reference yaw rate which is to act on the vehicle on the basis of the turning angle of the steering wheel detected by the steering angle detecting means, and an actual yaw rate detecting means which detects an actual yaw rate actually acting on the vehicle and said turning state judging means judges that the vehicle is making a turn when the turning angle of the steering wheel detected by the steering angle detecting means is not smaller than a predetermined value while said instable state judging means judges that the vehicle is in an instable state when the difference between the actual yaw rate and the reference yaw rate is not smaller than a predetermined value.

The instable state judging means may judge whether the vehicle is in an instable state by comparing a reference value of the yaw rate or the lateral acceleration which is set according to the turning condition of the vehicle with an actual value of the yaw rate or the lateral acceleration actually acting on the vehicle. In this case, it is preferred that said reference value includes an offset which is set in order to compensate for a delay of the behavior of the vehicle to operation of the steering wheel which is caused when the steering wheel is turned in the reverse direction. In this case, it is preferred that said reference value includes upper and lower limits.

Said instable state judging means may be arranged so that it calculates a plurality of the reference values on the basis of the vehicle speed and a plurality of filtered values of the steering wheel turning angle obtained by processing a steering wheel turning angle signal from a steering angle sensor by a plurality filters having different filter values, calculates a synthetic reference value which is the logical sum of the reference values, and judges whether the vehicle is in an oversteering state or in an understeering state on the basis of the actual value and the synthetic reference value. It is preferred that the reference values are arranged between upper and lower limits and each has a predetermined width.

The torque control means may be arranged not to shift to the driving force control for the instable state of the vehicle, which is to be effect ed when the vehicle is in an instable state, so long as the turning angle of the steering wheel is smaller than a predetermined value even if the instable state judging means judges that the vehicle is in an instable state.

Further the torque control means may be arranged to continue the driving force control for the instable state of the vehicle, which is to be effected when the vehicle is in an instable state, so long as the difference between the actual yaw rate and the reference yaw rate is not smaller than a predetermined value.

Further the torque control means may be arranged to set a threshold value of the rate of slip of the driving wheels over which it initiates reduction of the driving force to be smaller when the vehicle is running straight, when the vehicle is making a turn and when the vehicle is in an instable state in this order.

Further the torque control means may be arranged to effect the driving force control for the instable state of the vehicle, which is to be effected when the vehicle is in an instable skate, after effecting the driving force control for turning, which is to be effected when the vehicle is making a turn.

In accordance with a second aspect of the present invention, there is provided a driving control system for a vehicle which controls a rate of slip of the driving wheels relative to the road surface on the basis of a target rate of slip comprising a steering angle detecting means which detects the turning angle of the steering wheel, an actual yaw rate detecting means which detects an actual yaw rate actually acting on the vehicle, a reference yaw rate calculating means which calculates a reference yaw rate which is to act on the vehicle, a correcting means which makes an instable-state-based correction to reduce the target rate of slip by a first value when the vehicle is in an instable state where the difference between the actual yaw rate and the reference yaw rate is not smaller than a predetermined value, and a correction limiting means which prevents the correcting means from making the instable-state-based correction when the turning angle of the steering wheel is smaller than a predetermined value even if the difference between the actual yaw rate and the reference yaw rate is not smaller than the predetermined value.

The actual yaw rate detecting means may be an actual yaw rate calculating means which calculates the actual yaw rate on the basis of at least the vehicle speed and the difference between the wheel speeds of the left and right driven wheels.

Said correcting means may be arranged to make a turning-state-based correction to reduce the target rate of slip by a second value smaller than said first value when the vehicle is making a turn, and in this case, the correction limiting means is arranged to permit the correcting means to make the instable-state-based correction only after the turning-state-based correction.

In this case, said correcting means may be arranged to return the target rate of slip directly to the value before the turning-state-based correction (i.e., the value which is subjected to neither the truning-state-based correction nor the instable-state-based correction) when the steering wheel is returned toward the neutral position at a rate not lower than a predetermined value with the instable-state-based correction having been made, and to return the same once to the value after the turning-state-based correction when the steering wheel is returned toward the neutral position at a rate lower than a predetermined value with the instable-state-based correction having been made and then to the value before the turning-state-based correction when the vehicle ends the turn.

Whether the vehicle ends the turn may be detected on the basis of the difference in the wheel speed between the left and right driven wheels.

In the traction control system in accordance with the first aspect of the present where the torque control means reduces the driving force by a higher rate when the driving wheels slip while the vehicle is making a turn than when the driving wheels slip while the vehicle is running straight, and reduces the driving force by a higher rate when the driving wheels slip while the vehicle is in an instable state than when the driving wheels slip while the vehicle is making a turn, the driving force can be optimally controlled according to the state of the vehicle such as whether the vehicle is running straight, whether the vehicle is making a turn, whether the vehicle is in an oversteering state or whether the vehicle is in an understeering state, whereby a better running performance and a better running stability can be ensured irrespective of the state of the vehicle.

When the torque control means is arranged not to shift to the traction force control for the instable state of the vehicle so long as the turning angle of the steering wheel is smaller than a predetermined value even if the instable state judging means judges that the vehicle is in an instable state, the system can avoid making an unnecessary instable-state-based correction when the vehicle is running straight.

Further when the torque control means is arranged to continue the driving force control for the instable state of the vehicle so long as the difference between the actual yaw rate and the reference yaw rate is not smaller than a predetermined value, the abrupt increase of the driving force when the steering wheel is turned in the counter direction during a turn can be prevented, whereby running stability during a turn can be improved.

Further when the torque control means is arranged to effect the driving force control for the instable state of the vehicle after effecting the driving force control for turning, the system can avoid making an unnecessary instable-state-based correction when one of the driven wheels runs into a ditch or runs onto snow during straight running and it is misjudged that the vehicle is in an oversteering state.

In the traction control system in accordance with the second aspect of the present invention, the correction limiting means prevents the correcting means from making the instable-state-based correction when the turning angle of the steering wheel is smaller than a predetermined value even if the difference between the actual yaw rate and the reference yaw rate is not smaller than the predetermined value. Accordingly, the system can avoid making an unnecessary instable-state-based correction, for instance, when it is misjudged that the vehicle is in an oversteering state while the vehicle is running straight as when one of the driven wheels runs into a ditch or runs onto snow during straight running.

This arrangement is especially effective when the actual yaw rate detecting means is an actual yaw rate calculating means which calculates the actual yaw rate on the basis of at least the vehicle speed and the difference between the wheel speeds of the left and right driven wheels since such an actual yaw rate calculating means is apt to output a large actual yaw rate, for instance, when one of the driven wheels slips on snow or the like during a straight running.

When the correcting means is arranged to return the target rate of slip directly to the value before the turning-state-based correction when the steering wheel is returned toward the neutral position at a rate not lower than a predetermined value with the instable-state-based correction having been made, and to return the same once to the value after the turning-state-based correction when the steering wheel is returned toward the neutral position at a rate lower than a predetermined value with the instable-state-based correction having been made and then to the value before the turning-state-based correction when the vehicle ends the turn, the following results is obtained. That is, when the driver quickly returns the steering wheel, the state of the vehicle is expected to quickly shift from the oversteering state and the turning state to the straight running state. Accordingly, by returning the target rate of slip directly to the value before the turning-state-based correction when the steering wheel is returned toward the neutral position at a rate not lower than a predetermined value, the driving force can be quickly increased as soon as the vehicle comes to run straight. On the other hand, when the steering wheel is returned toward the neutral position at a rate lower than a predetermined value, i.e., when the driver returns the steering wheel slowly, the state of the vehicle is expected to be in the turning state for a while though comes out of the oversteering state. In this case, by returning the target rate of slip to the value after the turning-state-based correction and holding the same at the value until the vehicle ends the turn, the running stability during a turn can be ensured and at the same time the driving force can be quickly increased as soon as the vehicle comes to run straight.

When whether the vehicle ends the turn is detected on the basis of the difference in the wheel speed between the left and right driven wheels, the end of a turn can be more precisely detected than when the end of a turn is detected on the basis of the turning angle of the steering wheel since the vehicle can be in a turning state even if the turning angle of the steering wheel is 0 so long as there is a difference in the wheel speed between the left and right driven wheels.

DESCRIPTION OF THE PREFERRED EMBODIMENT

Figure 1:
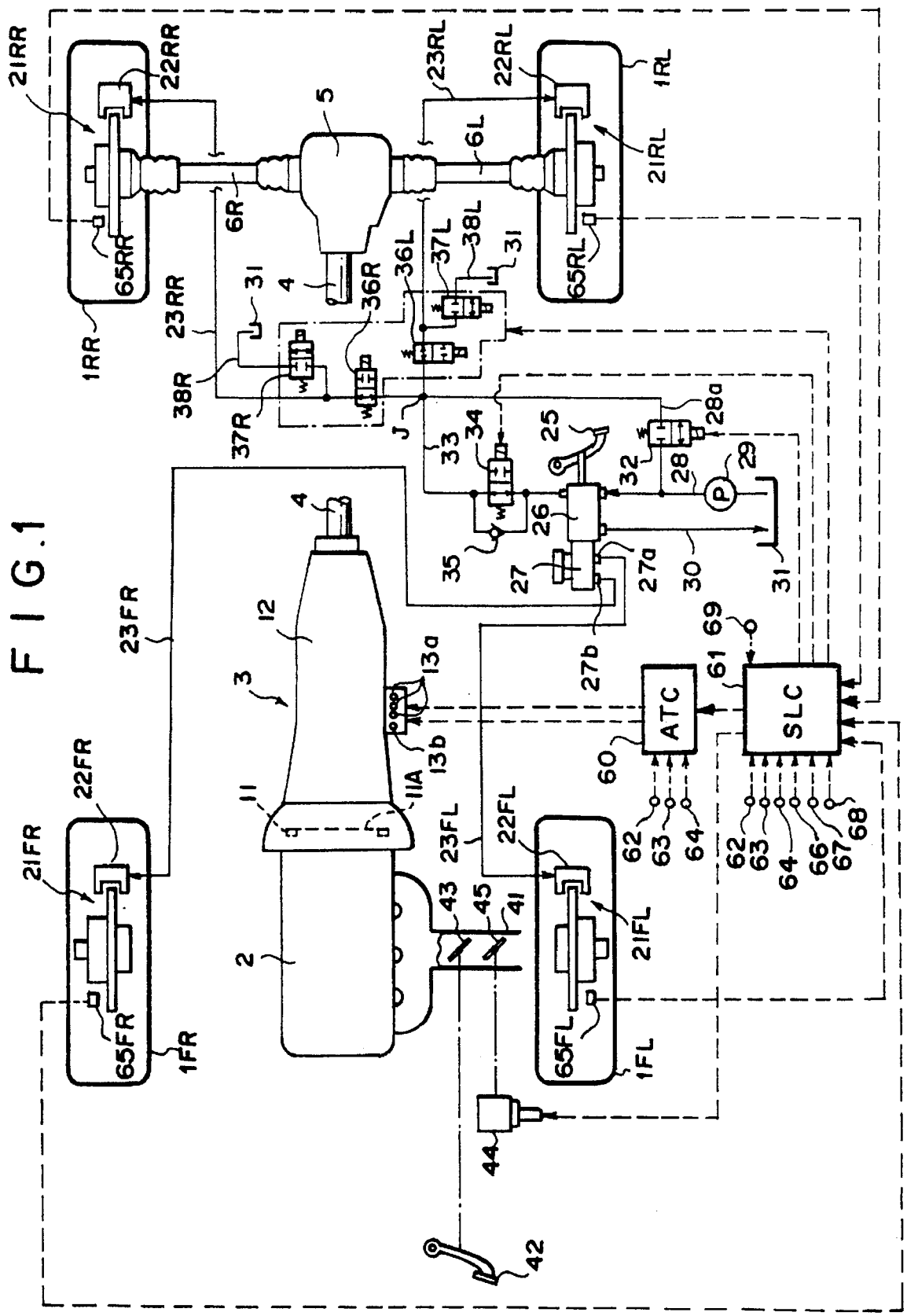
FIG. 1 is a schematic view showing a driving control system in accordance with an embodiment of the present invention.

In FIG. 1, a vehicle provided with a driving control system in accordance with an embodiment of the present invention comprises an engine 2 and the output torque of the engine 2 is transmitted to left and right rear wheels 1RL and 1RR through a fluid coupling automatic transmission 3, a propeller shaft 4, a differential 5 and left and right drive shafts 6L and 6R. Reference numerals 1FL and 1FR respectively denote left and right front wheels. That is, the vehicle is a front-engine rear-drive vehicle.

The automatic transmission 3 comprises a fluid coupling torque converter 11 and a transmission gear mechanism 12 and has four forward speeds and one reverse in this embodiment. Gear-shifting is effected by selectively energizing and de-energizing a plurality of solenoids 13a incorporated in a hydraulic circuit. The torque converter 11 is provided with a hydraulic lockup clutch 11A which is engaged and disengaged by energizing and de-energizing a solenoid 13b incorporated in a hydraulic circuit.

The solenoids 13a and 13b are controlled by an automatic transmission control means (ATC) 60. The automatic transmission control means 60 stores a gear-shifting characteristic and a lockup characteristic and controls gear-shifting and lockup respectively on the basis of the gear-shifting characteristic and the lockup characteristic. For this purpose, a main throttle opening signal, a sub-throttle opening signal and a vehicle speed signal are input into the automatic transmission control means 60 respectively from a main throttle opening sensor 62 which detects the opening of a main throttle valve 43, a sub-throttle opening sensor 63 which detects the opening of a sub-throttle valve 45 and a vehicle speed sensor 64 which detects the vehicle speed (represented by the rotational speed of the propeller shaft 4).

The driving control system of this embodiment controls the rate of slip of the driving wheels 1RL and 1RR to a proper value when the rate of slip of the driving wheels 1RL and 1RR becomes excessive due to an excessive driving torque. The driving control system has a first target rate of slip and a second target rate of slip larger than the first target rate of slip and controls the engine output and/or the braking force to the driving wheels 1RL and 1RR on the basis of the first and second target rates of slip, thereby controlling the rate of slip of the driving wheels 1RL and 1RR.

That is, the driving control system has a target rate of slip SET for controlling the engine 2 as the first target rate of slip and a target rate of slip SBT for controlling the brakes as the second target rate of slip. When the rate of slip of the driving wheels 1RL and 1RR exceeds the first target rate of slip SET, the traction control system initiates control of the engine output and when the rate of slip still increases and exceeds the second target rate of slip SBT, the traction control system initiates the brake control in addition to the engine output control. The engine output control and the brake control are effected by a slip control means 61.

The wheels 1FL, 1FR, 1RL and 1RR are respectively provided with brakes 21FL, 21FR, 21RL and 21RR. Brake fluid pressure is applied to calipers (wheel cylinders) 22FL, 22FR, 22RL and 22RR of the brakes 21FL, 21FR, 21RL and 21RR through brake lines 23FL, 23FR, 23RL and 23RR.

When a brake pedal 25 is pushed down, the pedal pushing force is multiplied by a hydraulic booster 26 and then transmitted to a tandem master cylinder 27. A left front brake line 23FL is connected to a first discharge port 27a of the master cylinder 27 and a right front brake line 23FR is connected to a second discharge port 27b of the master cylinder 27.

A fluid pressure from a pump 29 is applied to the booster 26 through a line 28 and excessive fluid is returned to a reservoir 31 through a return line 30. A branch line 28a branching off the line 28 is connected to a junction J which will be described later. The branch line 28a is provided with an electromagnetic on-off valve 32. The multiplying fluid pressure generated in the booster 26 is applied to the junction J through a line 33 which is also provided with an electromagnetic on-off valve 34. A bypass line is provided in the line 33 in parallel to the on-off valve 34 and a one-way valve 35 which permits the brake fluid to flow only toward the junction J is provided in the bypass line.

A left rear brake line 23RL and a right rear brake line 23RR are connected to the junction J and are respectively provided with electromagnetic on-off valves 36L and 36R. Pressure relief lines 38L and 38R are respectively connected to the rear brake lines 23RL and 23RR downstream of the on-off valves 36L and 36R and are respectively provided with on-off valves 37L and 37R.

The on-off valves 32, 34, 36L, 36R, 37L and 37R are controlled by the slip control means 61. That is, when the slip control by the brake control is not effected, the on-off valve 32 is closed with the on-off valve 34 opened and the on-off valves 37L and 37R are closed with the on-off valves 36L and 36R opened. When the brake pedal 25 is pushed down in this state, a brake fluid pressure is applied to the front brakes 21FL and 21FR through the master cylinder 27 and a multiplying fluid pressure from the booster 26 is applied to the rear brakes 21RL and 21RR through the line 33 as the brake fluid pressure.

When the rate of slip of the driving wheels 1RL and 1RR relative to the road surface becomes large and the slip control by the brake control is to be effected, the on-off valve 34 is closed and the on-off valve 32 is opened. Then the brake fluid pressure is held constant, increased or reduced by duty control of the on-off valves 36L and 37L (36R and 37R). That is, with the on-off valve 32 opened, the brake fluid pressure is held constant when the on-off valves 36L, 37L, 37L and 37R are closed, is increased when the on-off valve 36L (36R) is opened and the 37L (37R) is closed, and is reduced when the on-off valve 36L (36R) is closed and the 37L (37R) is opened. The brake fluid pressure through the branch line 28a is prevented from acting on the brake pedal 25 as a counterforce by the one-way valve 35.

When the brake pedal 25 is pushed down while such a slip control is being effected, a brake fluid pressure according to the pedal pushing force is applied to the rear brakes 21RL and 21RR through the one-way valve 35.

The slip control means 61 reduces the driving torque of the driving wheels 1RL and 1RR also by reducing the driving torque transmitted to the driving wheels 1RL and 1RR, i.e., the output torque of the engine 2. For this purpose, an intake passage 41 of the engine 2 is provided with said main throttle valve 43 and the sub-throttle valve 45. The main throttle valve 43 is connected to an accelerator pedal 42 and the sub-throttle valve 45 is connected to an actuator 44 which is controlled by the slip control means 61.

In addition to the signals from the throttle opening sensors 62 and 63 and the vehicle speed sensor 64, wheel speed signals from wheel speed sensors 65FL, 65FR, 65RL and 65RR which respectively detects the wheel speeds of the wheels 1FL, 1FR, 1RL and 1RR, an accelerator depression signal from an accelerator depression sensor 66 which detects the amount of depression of the accelerator pedal 42, a steering angle signal from a steering angle sensor 67 which detects the turning angle of a steering wheel, a mode signal from a mode switch 68 which is manually operated and an engine speed signal from an engine speed sensor 69 which detects the engine speed are input into the slip control means 61.

The slip control means 61 is provided with an input interface for receiving the signals from the sensors described above, a microcomputer comprising a CPU, a ROM and a RAM, an output interface and a drive circuit for driving the valves 32, 34, 36L, 36R, 37L and 37R and the actuator 44. Control programs, maps and the like necessary for the slip control are stored in the ROM and various memories necessary for performing the slip control are provided in the RAM.

Figure 2:
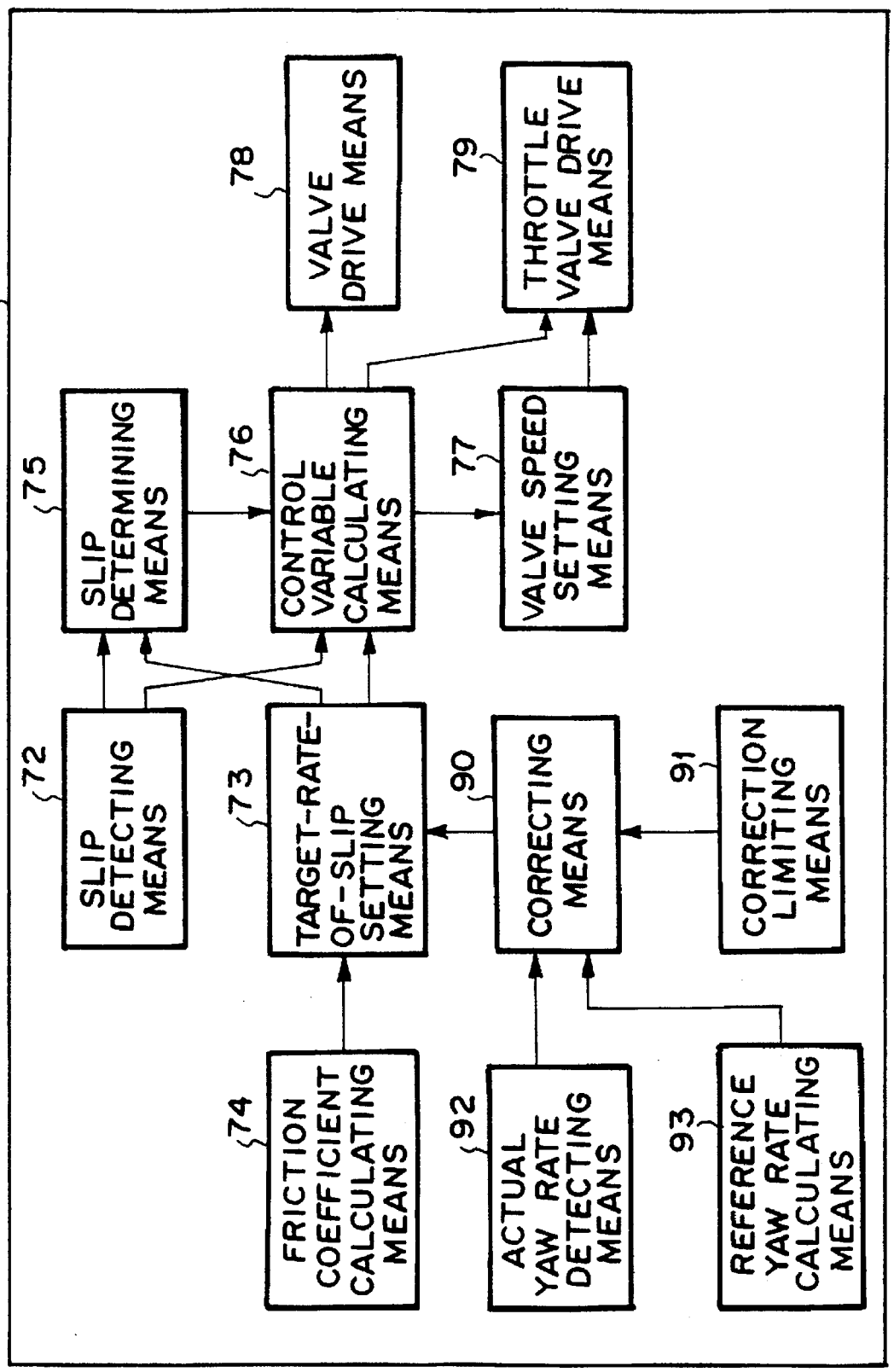
FIG. 2 is a block diagram for illustrating in detail the slip control means.

More particularly, as shown in FIG. 2, the slip control means 61 is provided with a slip detecting means 72, a target-rate-of-slip setting means 73 which sets the target rates of slip (threshold values), a friction coefficient calculating means 74 which calculates the friction coefficient of the road surface, a slip determining means 75, a control variable calculating means 76, a valve speed setting means 77 which sets the valve speed of the sub-throttle valve 45, a valve drive means 78 which drives the valves 32, 34, 36L, 36R, 37L and 37R and a throttle valve drive means 79 which drives the actuator 44.

The rate of slip of the driving wheels 1RL and 1RR is detected on the basis of the detecting signals of the wheel speed sensors 65FL, 65FR, 65RL and 65RR. That is, the slip detecting means 72 calculates the rate of slip S of the driving wheels 1RL and 1RR by subtracting the wheel speed of the driven wheels 1FL and 1FR from the wheel speed of the driving wheels 1RL and 1RR. When the rate of slip S of the driving wheels 1RL and 1RR is used for the engine output control, the larger of the wheel speeds of the left and right driving wheels 1RL and 1RR is used as the wheel speed of the driving wheels 1RL and 1RR and the average of the wheels speeds of the left and right driven wheels 1FL and 1FR is used as the wheel speed of the driven wheels. When the rate of slip S of the driving wheels 1RL and 1RR is used for the brake control, the rates of slip S of the left and right driving wheels 1RL and 1RR are separately calculated on the basis of the wheel speeds of the respective driving wheels 1RL and 1RR and the average of the wheel speeds of the left and right driven wheels in order to separately control the braking forces applied to the respective driving wheels 1RL and 1RR.

Figure 3:
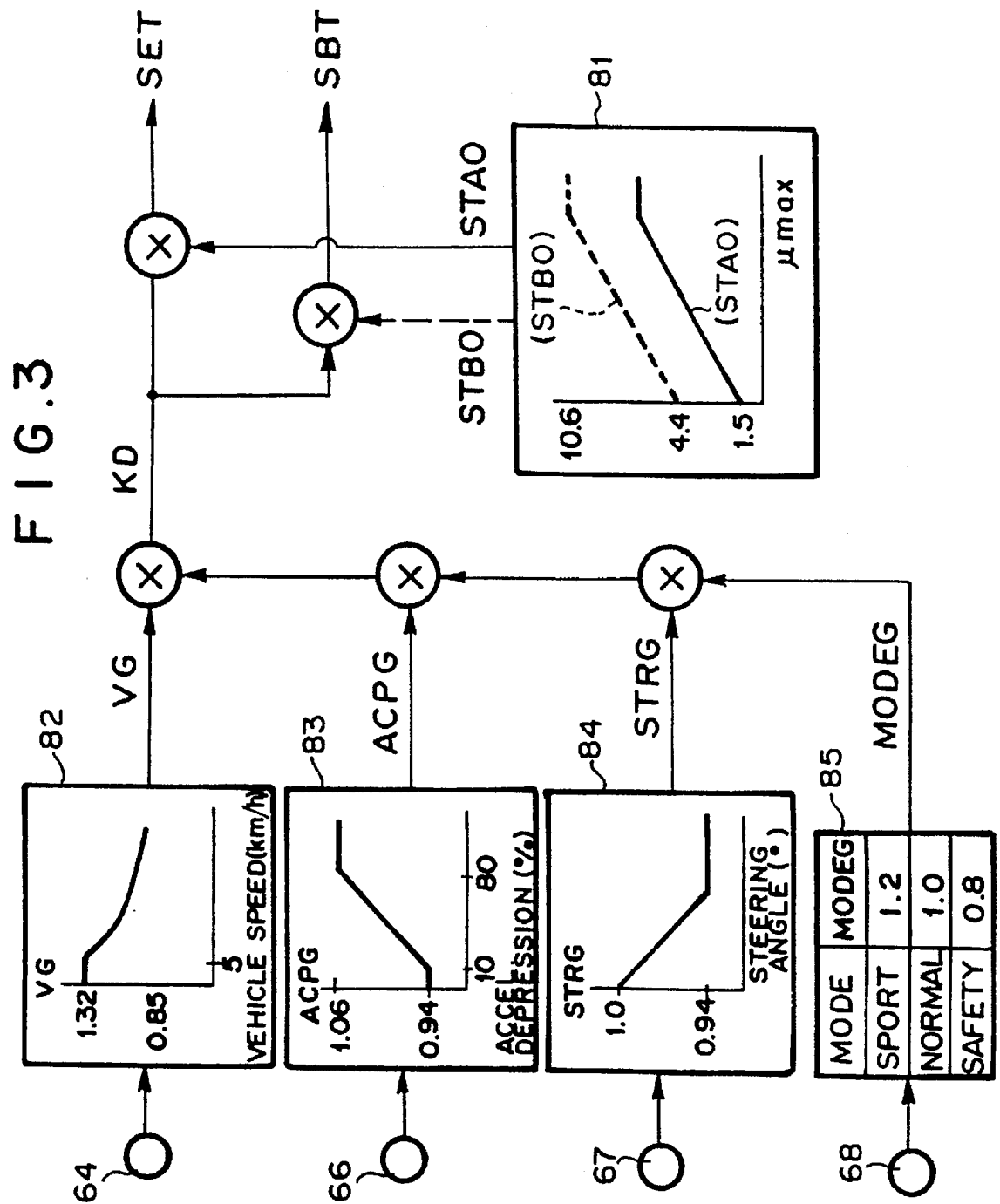
FIG. 3 is a view showing the circuit diagram for calculating the first and second target rates of slip.

FIG. 3 schematically shows the circuit for determining the first target rate of slip SET for the engine control and the second target rate of slip SBT for the brake control. The vehicle speed, the amount of depression of the accelerator pedal, the turning angle of the steering wheel, the position of the mode switch 68 and the friction coefficient µ of the road surface are used as parameters for determining the target rates of slip SET and SBT (SBT>SET).

In FIG. 3, basic values STAO and STBO of the first target rate of slip SET and the second target rate of slip SBT are stored in a map 81 using the friction coefficient µ of the road surface as a parameter. The basic values STAO and STBO increase as the friction coefficient µ increases (STBO>STAO). The first target rate of slip SET and the second target rate of slip SBT are obtained by multiplying the respective basic values STAO and STBO by a correction gain coefficient KD.

The correction gain coefficient KD is obtained by multiplying gain coefficients VG, ACPG, STRG and MODEG together. The gain coefficient VG is a coefficient determined on the basis of the vehicle speed and is stored in a map 82. The gain coefficient ACPG is a coefficient determined on the basis of the amount of depression of the accelerator pedal and is stored in a map 83. The gain coefficient STRG is a coefficient determined on the basis of the turning angle of the steering wheel and is stored in a map 84. The gain coefficient MODEG is a coefficient selected by the driver and is stored in a map 85. In this embodiment three modes, a sport mode, a normal mode and a safety mode, are prepared.

Figure 4:
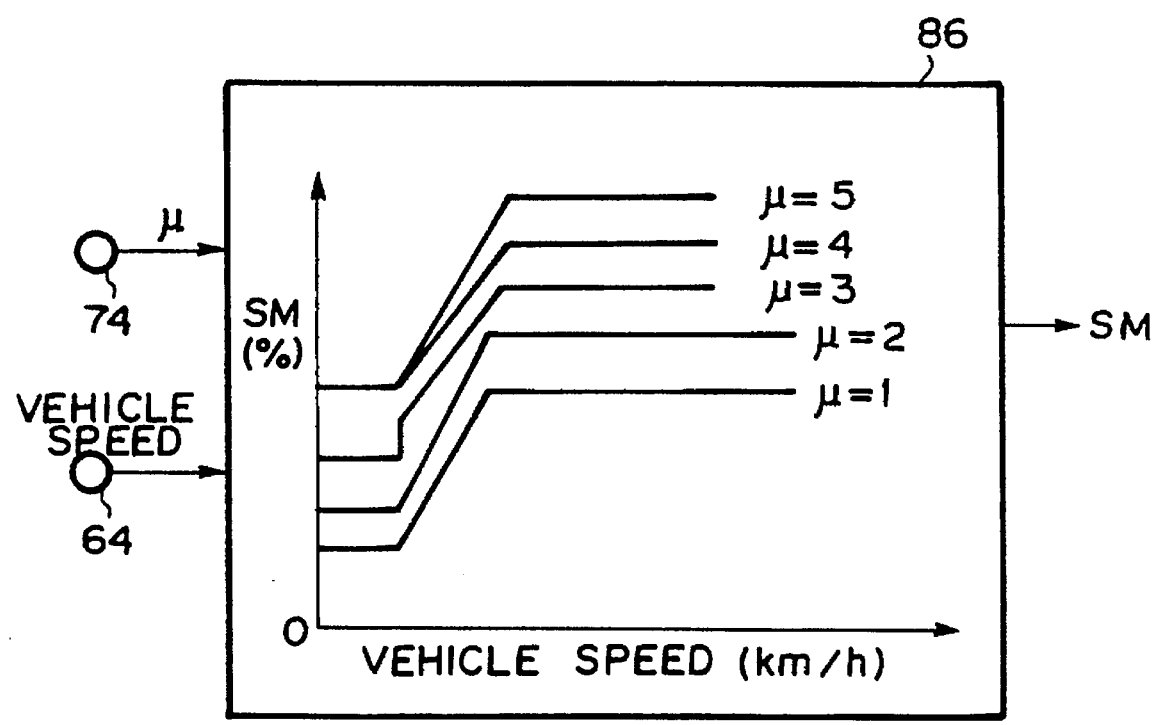
FIG. 4 is the map for setting the lower limit control value.

A lower limit control value SM which will be described later is determined on the basis of the vehicle speed and the friction coefficient µ of the road surface and is stored in a map 86 shown in FIG. 4. The lower limit control value SM is in terms of the throttle opening (%) and when the throttle valve is full closed, the throttle opening is 0% and when the throttle valve is full opened, the throttle opening is 100%. In FIG. 4, the minimum friction coefficient µ is 1 and the maximum friction coefficient µ is 5.

The friction coefficient µ of the road surface is calculated on the basis of the vehicle speed Vr and the acceleration VG of the vehicle. The acceleration VG of the vehicle is calculated using a 100 msec counter and a 500 msec counter. That is, until 500 msec lapses from initiation of the slip control (when the vehicle speed is not sufficiently high), the acceleration VG of the vehicle is calculated on the basis of the change in the vehicle speed Vr (the higher of the wheel speeds of the driven wheels 1FL and 1FR) in 100 msec according to the following formula (1) every 100 msec. After 500 msec lapses from initiation of the slip control (when the vehicle speed is sufficiently high), the acceleration VG of the vehicle is calculated on the basis of the change in the vehicle speed Vr in 500 msec according to the following formula (2) every 500 msec.

$$VG = Gk1 \times \{Vr(k) - Vr(k-100)\} \tag{1}$$

$$VG = Gk2 \times \{Vr(k) - Vr(k-500)\} \tag{1}$$

Gk1 and Gk2 are coefficients. Vr(k) represents the vehicle speed Vr at that time, Vr(k−100) represents the vehicle speed Vr 100 msec before and Vr(k−500) represents the vehicle speed Vr 500 msec before. The friction coefficient µ of the road surface is obtained from the following table 1 by three-dimensional interpolation on the basis of the acceleration VG of the vehicle thus obtained and the vehicle speed Vr.

TABLE 1

| Vr | VG | | | | | | | | |
|---|---|---|---|---|---|---|---|---|---|
| | 0.00 | 0.05 | 0.10 | 0.15 | 0.20 | 0.25 | 0.30 | 0.35 | 0.40 |
| 000 | 1.0 | 1.0 | 2.0 | 2.0 | 3.0 | 3.0 | 4.0 | 4.0 | 5.0 |
| 020 | 1.0 | 1.0 | 2.0 | 2.0 | 3.0 | 4.0 | 4.0 | 5.0 | 5.0 |
| 040 | 1.0 | 1.0 | 2.0 | 3.0 | 3.0 | 4.0 | 4.0 | 5.0 | 5.0 |
| 060 | 1.0 | 1.0 | 2.0 | 3.0 | 4.0 | 4.0 | 5.0 | 5.0 | 5.0 |
| 080 | 1.0 | 1.0 | 2.0 | 3.0 | 4.0 | 5.0 | 5.0 | 5.0 | 5.0 |
| 100 | 1.0 | 1.0 | 2.0 | 4.0 | 4.0 | 5.0 | 5.0 | 5.0 | 5.0 |
| 120 | 1.0 | 2.0 | 3.0 | 4.0 | 5.0 | 5.0 | 5.0 | 5.0 | 5.0 |
| 140 | 1.0 | 2.0 | 3.0 | 5.0 | 5.0 | 5.0 | 5.0 | 5.0 | 5.0 |

The slip determining means 75 whether the slip control should be effected on the basis of the actual rate of slip S of the driving wheels 1RL and 1RR detected by the slip detecting means 72, the first target rate of slip ET, and the second target rate of slip SBT. That is, the slip determining means 75 determines that the slip control by the engine output control should be effected when the actual rate of slip S is higher than the first target rate of slip SET and that the slip control by the engine output control is not necessary when the former is lower than the latter for a predetermined time t. Further the slip determining means 75 determines that the slip control by the brake control should be effected when the actual rate of slip S is higher than the second target rate of slip SBT.

The control variable calculating means 76 calculates a control variable for opening and closing the sub-throttle valve 45 (an engine control variable) and a brake control variable on the basis of the actual rate of slip S of the driving wheels 1RL and 1RR detected by the slip detecting means 72, the first target rate of slip SET, and the second target rate of slip SBT. When the control variable for opening and closing the sub-throttle valve 45 (will be referred to as "the sub-throttle control variable", hereinbelow) is determined, a basic sub-throttle control variable T is first obtained from the following table (map) 2 on the basis of a difference in rate of slip EN between the actual rate of slip S and the first target rate of slip SET (the following formula (3)) and the rate of change DEN of the difference in rate of slip EN.

$$EN=S-SET \quad (3)$$

TABLE 2

|    |     | DEN |    |    |    |    |    |    |
|----|-----|-----|----|----|----|----|----|----|
|    |     | (−) |    |    | 0  |    |    | (+)|
| EN | (−) | PB  | PB | PB | PB | PM | ZO | ZO |
|    |     | PM  | PM | PM | PM | PS | ZO | ZO |
|    |     | PM  | PM | PM | PS | ZO | ZO | ZO |
|    | 0   | PS  | PS | PS | ZO | ZO | ZO | ZO |
|    |     | ZO  | ZO | ZO | ZO | NS | NS | NS |
|    |     | ZO  | ZO | NS | NM | NM | NM | NM |
|    | (+) | ZO  | ZO | NM | NB | NB | NB | NB |

In table 2, ZO represents that the opening of the sub-throttle valve 45 is to be held, N represents that the sub-throttle valve 45 is to be closed and P represents that the sub-throttle valve 45 is to be opened. S, M and B attached to N and P respectively stand for a small control variable, a middle control variable and a large control variable.

Then a sub-throttle control variable correction coefficient $T_G$ is obtained from the following table (map) 3 and the final sub-throttle control variable $T_A$ is calculated.

$$T_A = T \times T_G$$

TABLE 3

|     |                           | 0% | throttle opening | 100% |
|-----|---------------------------|----|------------------|------|
| NER | NER < 3000 rpm            |    | 1.0              | 2.0  3.0 |
|     | 3000 rpm ≦ NER < 5000 rpm | 1.0 | 2.0             | 3.0  |
|     | 5000 rpm ≦ NER            | 1.0 | 2.0             | 3.0  |

In table 3, the throttle opening and the engine speed NER are used as parameters for determining the sub-throttle control variable correction coefficient $T_G$. Since the correction coefficient $T_G$ is more effective to the engine revolution as the throttle opening becomes smaller and as the engine speed becomes lower, the correction coefficient $T_G$ is set smaller as the throttle opening becomes smaller and as the engine speed becomes lower. The correction coefficient $T_G$ may be determined solely on the basis of the throttle opening.

The brake control variable is calculated substantially in the same as manner as the sub-throttle control variable and will not be described here.

The valve speed setting means 77 sets the sub-throttle valve driving speed (%/sec), that is, the speed at which the sub-throttle valve 45 is opened or closed, on the basis of the sub-throttle control variable $T_A$ calculated by the control variable calculating means 76 according to the following table (map) 4. When the sub-throttle valve 45 is full opened, the valve opening is 100%.

TABLE 4

| label | NB  | NM | NS | ZO | PS | PM | PB |
|-------|-----|----|----|----|----|----|----|
| speed | −10 | −5 | −2 | 0  | +2 | +5 | +8 |

In table 4, the valve closing speed is set higher than the valve opening speed in the range where the control variable is large, and the valve closing speed and the valve opening speed are set equal to each other in the range where the control variable is small.

The valve drive means 78 outputs drive signals to the valves 32, 34.36L, 36R, 37L and 37R so that the brake control variable calculated by the control variable calculating means 76 is obtained and the throttle valve drive means 79 outputs a drive signal to the actuator 44 to drive the sub-throttle valve 45 at the speed set by the valve speed setting means 77 so that the sub-throttle control variable $T_A$ calculated by the control variable calculating means 76 is obtained.

The slip control means 61 effects the slip control in the following manner.

Figure 5:
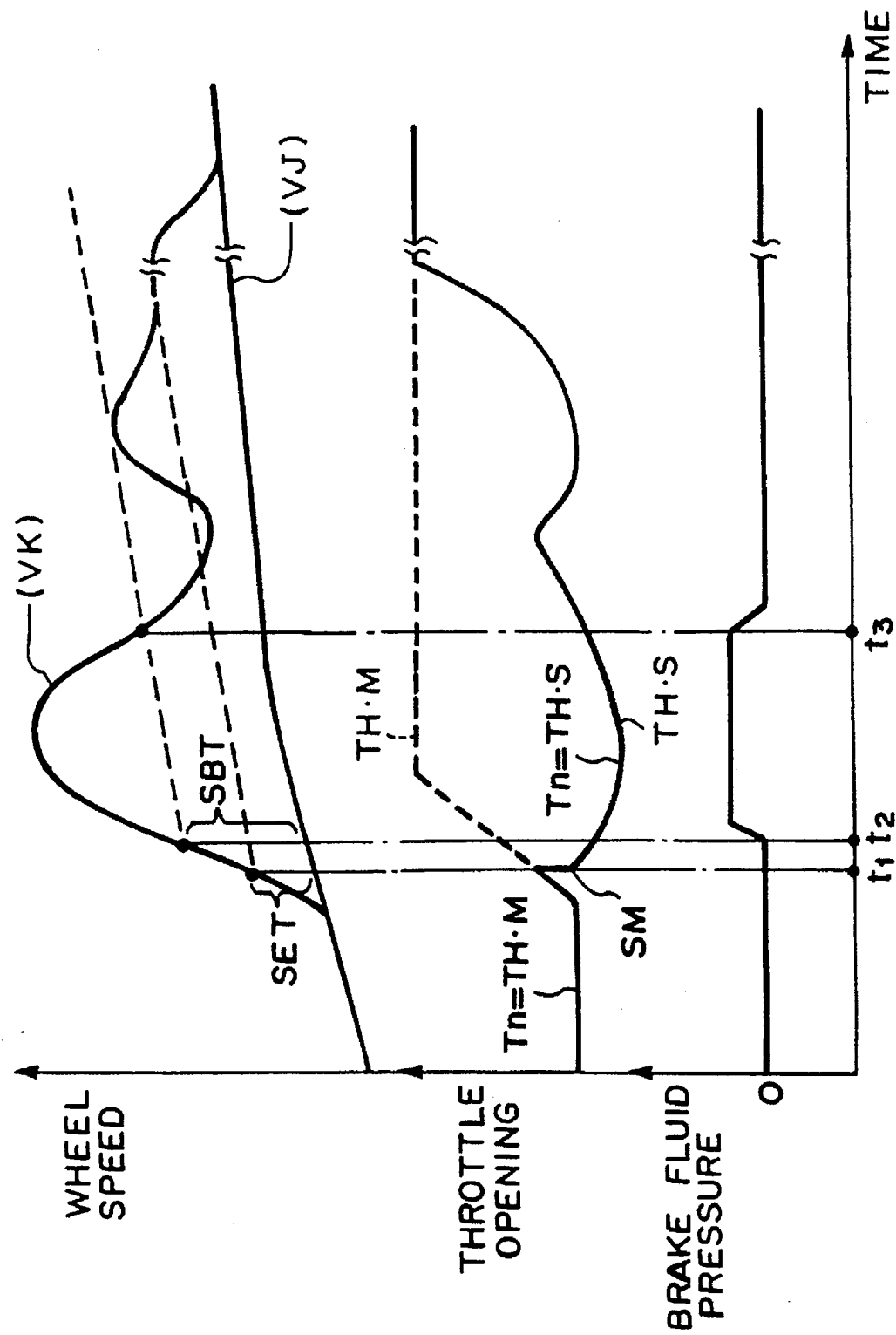
FIG. 5 is a time chart for illustrating the slip control.

In FIG. 5, the actual rate of slip S of the driving wheels 1RL and 1RR is not high and the slip control by the engine control is not effected until time t1. In this state, the sub-throttle valve 45 is full opened and accordingly the throttle opening Tn (depending on the smaller of the openings of the main throttle valve 43 and the sub-throttle valve 45) is equal to the opening TH·M of the main throttle valve 43 which corresponds to the amount of depression of the accelerator pedal.

At time t1, the actual rate of slip S reaches the first target rate of slip SET. In this particular embodiment, the slip control is initiated when the actual rate of slip S becomes not lower than the first target rate of slip SET, and the opening of the sub-throttle valve 45 is immediately reduced to the lower limit control value SM (feedforward control) at time t1. Then the opening of the sub-throttle valve 45 is feedback-controlled so that the actual rate of slip S converges on the first target rate of slip SET. At this time, the throttle opening Tn corresponds to the opening TH·S of the sub-throttle valve 45.

When the actual rate of slip S becomes not lower than the second target rate of slip SBT (at time t2), the brake fluid pressure is applied to the brakes 21RL and 21RR for the driving wheels 1RL and 1RR and the slip control is effected by both the engine control and the brake control.

When the actual rate of slip S lowers below the second target rate of slip SBT (at time t3), the brake fluid pressure applied to the brakes is gradually lowered and then nullified while the engine control is continued.

The actual rate of slip S quickly increases after the throttle opening Tn is reduced to the lower limit control value SM at one stroke at time t1. In such a case, the difference in rate of slip EN and the rate of change DEN of the difference in rate of slip EN are of large values (positive) and accordingly NB is obtained as the control variable for opening and closing the sub-throttle valve 45. As a result, the sub-throttle valve 45 is closed at a high speed and the actual rate of slip S comes to lower and approaches the first target rate of slip SET.

Thereafter NM, NS and ZO are successively obtained as the control variable for opening and closing the sub-throttle valve 45 and the throttle opening Tn is held relatively small. Then the actual rate of slip S becomes close to the first target rate of slip SET, PS is obtained as the control variable for opening and closing the sub-throttle valve 45 and the sub-throttle valve 45 is opened. In such a small amount of opening and closing of the sub-throttle valve 45, the sub-throttle valve 45 is opened and closed at a low speed and the actual rate of slip S is not quickly increased or reduced, whereby hunting of the control is suppressed.

When the friction coefficient μ of the road surface temporarily increases, the actual rate of slip S becomes lower than the first target rate of slip SET and sometimes PB is obtained as the control variable for opening and closing the sub-throttle valve 45. However in this case, the sub-throttle valve 45 is driven at a lower speed than when NB is obtained and accordingly, the throttle opening Tn cannot be abruptly enlarged, whereby the actual rate of slip S is prevented from becoming excessively high when the friction coefficient μ of the road surface subsequently reduces.

In this particular embodiment, the slip control is terminated when the actual rate of slip S lowers below the first target rate of slip SET and the amount of depression of the accelerator pedal becomes zero, or when the opening of the main throttle valve 43 becomes smaller than that of the sub-throttle valve 45, or when the brake pedal is pushed down.

The brake control is terminated when the brake fluid pressure is kept reduced for a predetermined time. Otherwise, the brake control may be terminated in the following manner. That is, reduction of the brake fluid pressures for both the driving wheels 1RL and 1RR is counted as a positive count, increase of the brake fluid pressures for both the driving wheels 1RL and 1RR is counted as a reset, and holding of the brake fluid pressure or reduction of the brake fluid pressure for one of the driving wheels 1RL and 1RR is counted as 0 and the counts are summed up. When the sum of the counts reaches a predetermined value, the brake control is terminated.

As shown in FIG. 2, the slip control means 61 is further provided with a correcting means 90 which corrects the first target rate of slip SET and the second target rate of slip SBT and a correction limiting means 91 which limits correction of the target rates of slip by the correcting means. The slip control means 61 is further provided with an actual yaw rate detecting means 92 which detects the yaw rate actually acting on the vehicle and a reference yaw rate calculating means 93 which calculates a reference yaw rate which is to act on the vehicle as well as a steering angle detecting means (said steering angle sensor 67) in order to effect a correction limiting control for limiting the correction of the target rates of slip.

In this specification, it is assumed that the yaw rate which acts on the vehicle during a right turn is positive and the yaw rate which acts on the vehicle during a left turn is negative. Accordingly, in the case of a right turn, when the reference yaw rate (target yaw rate) is larger than the actual yaw rate and the difference therebetween is not smaller than a predetermined value, the vehicle is considered to be in an understeering state while when the reference yaw rate is smaller than the actual yaw rate and the difference therebetween is not smaller than the predetermined value, the vehicle is considered to be in an oversteering state. In the case of a left turn, when the reference yaw rate is larger than the actual yaw rate and the difference therebetween is not smaller than the predetermined value, the vehicle is considered to be in an oversteering state while when the reference yaw rate is smaller than the actual yaw rate and the difference therebetween is not smaller than the predetermined value, the vehicle is considered to be in an understeering state.

The correcting means 90 makes an oversteering-state-based correction or an understeering-state-based correction for reducing the target rates of slip when the difference between the actual yaw rate and the reference yaw rate (the value obtained by subtracting the reference yaw rate from the actual yaw rate) is not smaller than a predetermined value. The correction limiting means 91 inhibits the correcting means 90 from making the oversteering-state-based or understeering-state-based correction when the turning angle of the steering wheel detected by the steering angle sensor 67 is smaller than a predetermined value (i.e., when the vehicle is not making a turn) even if the vehicle comes to an oversteering state or an understeering state under the condition where the oversteering-state-based or understeering-state-based correction has not been made.

More particularly, the correcting means 90 makes a turning-state-based correction for reducing the target rates of slip when the vehicle is making a turn as well as the oversteering-state-based correction and understeering-state-based correction. In the turning-state-based correction, the target rates of slip are reduced by an amount smaller than that in the oversteering-state-based correction or the understeering-state-based correction. The correction limiting means 91 permits the correcting means 90 to make the oversteering-state-based or understeering-state-based correction only after the turning-state-based correction correction.

When the steering wheel is returned at a speed not lower than a predetermined value while the oversteering-state-based or understeering-state-based correction has been effected, the correcting means 90 directly returns the value of the target rates of slip to the value before the turning-state-based correction and when the steering wheel is returned at a speed lower than the predetermined value while the oversteering-statebased or understeering-state-based correction has been effected, the correcting means 90 returns the value of the target rates of slip once to the value after the turning-state-based correction and then to the value before the turning-state-based correction when the vehicle ends the turn.

Figure 6:
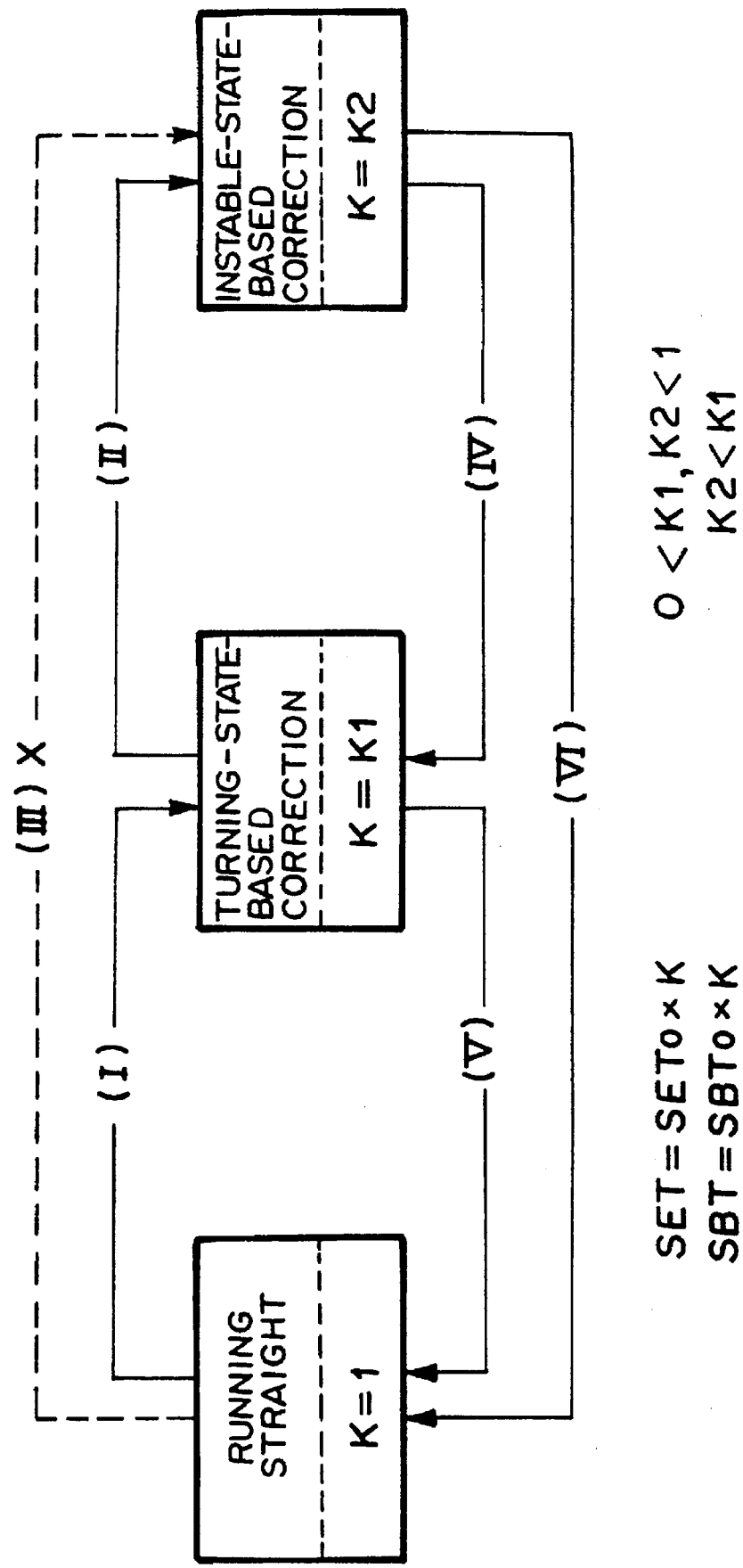
FIG. 6 is a view for illustrating an example of the target-rate-of-slip correction control and the correction limiting control.

That is, as shown in FIG. 6, the target rates of slip SET and SBT are calculated according to formulae $$SET = SETo \times K$$

and $$SBT = SBTo \times K$$

wherein SETo and SBTo represents the values of the first target rate of slip SET and the second target rate of slip SBT as calculated by the target-rate-of-slip setting means 73 in the manner described above and K represents a coefficient. When the vehicle is running straight, K is set to 1 and SETo and SBTo, as they are, are used as the first target rate of slip SET and the second target rate of slip SBT. When the turning angle of the steering wheel is not smaller than the predetermined value, K is set to K1 (0<K1<1) and when the difference between the actual yaw rate and the reference yaw rate is not smaller than the predetermined value (the vehicle is in an oversteering state or an understeering state), K is set to K2 (0<K2<K1<1). Thus when the vehicle is making a turn, the target rates of slip SET and SBT are reduced from the values when the vehicle is running straight (the turning-state-based correction) and when the vehicle comes to an oversteering state or an understeering state, the target rates of slip SET and SBT are further reduced (the oversteering-state-based correction or the understeering-state-based correction). The oversteering-state-based correction or the understeering-state-based correction is effected only after the turning-state-based correction. In other words, either of the oversteering-state-based correction and the understeering-state-based correction is inhibited when the vehicle is not making a turn.

Since the turning angle of the steering wheel is naturally not smaller than the predetermined value when the oversteering-state-based or understeering-state-based correction has been effected, the coefficient K is set to 1 when the steering wheel is returned at a speed not lower than the predetermined value (this control is not performed until the difference between the actual yaw rate and the reference yaw rate becomes smaller than a predetermined value), whereby the values of the target rates of slip are directly returned to the values before the turning-state-based correction (SETo, SBTo) while the coefficient K is once set to K1 when the steering wheel is returned at a speed lower than the predetermined value, whereby the values of the target rates of slip are returned once to the values after the turning-state-based correction and then to 1 when the vehicle ends the turn, whereby the values of the target rates of slip are returned to the values before the turning-state-based correction (SETo, SBTo).

That is, in FIG. 6, when the steering wheel is turned by an angle not smaller than the predetermined value while the vehicle running straight and the vehicle comes to make a turn, the turning-state-based correction is effected as shown by arrow (I), and when the vehicle comes to an instable state (oversteering state or understeering state) while the turning-state-based correction is effected, the instable-state-based correction (the oversteering-state-based correction or the understeering state correction) is effected as shown by arrow (II). However if the vehicle comes to an instable state when the turning angle of the steering wheel is smaller than the predetermined state (the vehicle is not making a turn), the instable-state-based correction is not effected as shown by arrow (III). When the steering wheel is returned while the instable-state-based correction is effected and when the returning speed of the steering wheel is not lower than the predetermined speed, the target rates of slip are directly returned to the values before the turning-state-based correction (SETo, SBTo) as shown by arrow (VI). On the other hand, when the steering wheel is returned while the instable-state-based correction is effected and when the returning speed of the steering wheel is lower than the predetermined speed, the target rates of slip are returned once to the values after the turning-state-based correction as shown by arrow (IV) and then to the values before the turning-state-based correction (SETo, SBTo) as shown by arrow (V).

Though the actual yaw rate detecting means 92 may comprise any known yaw rate sensor, a yaw rate detecting means which calculates the actual yaw rate on the basis of at least the difference in the wheel speed between the left and right driven wheels and the vehicle speed is employed in this embodiment. For example, the actual yaw rate can be calculated according to the following formula.

actual yaw rate (lateral acceleration G)=vehicle speed×(left driven wheel speed–right driven wheel speed)÷(tread×9.8)

Though the reference yaw rate calculating means 93 may be of various types, a reference yaw rate calculating means which calculates the reference yaw rate on the basis of the vehicle speed and the turning angle of the steering wheel is employed in this embodiment. The reference yaw rate calculating means 93 has a map in which the reference yaw rate is related to the vehicle speed and the turning angle of the steering wheel and determines the reference yaw rate according to the map on the basis of the vehicle speed and the turning angle of the steering wheel.

Further, in this embodiment, whether the vehicle is making turn is determined on the basis of whether the turning angle of the steering wheel is not smaller than a predetermined value as described above, and whether the vehicle has ended the turn is determined on the basis of the difference between the left driven wheel and the right driven wheel speed. That is, when the difference between the left driven wheel speed and the right driven wheel speed becomes not larger than a predetermined value, it is determined that the vehicle has ended the turn, i.e., that the vehicle is running straight. However whether the vehicle has ended the turn may be determined on the basis of the turning angle of the steering wheel. That is, it may be determined that the vehicle has ended the turn when the turning angle of the steering wheel becomes smaller than the predetermined value.

A concrete example of the the control described above will be described with reference to the flow charts shown in FIGS. 7 and 8, hereinbelow.

Figure 7:
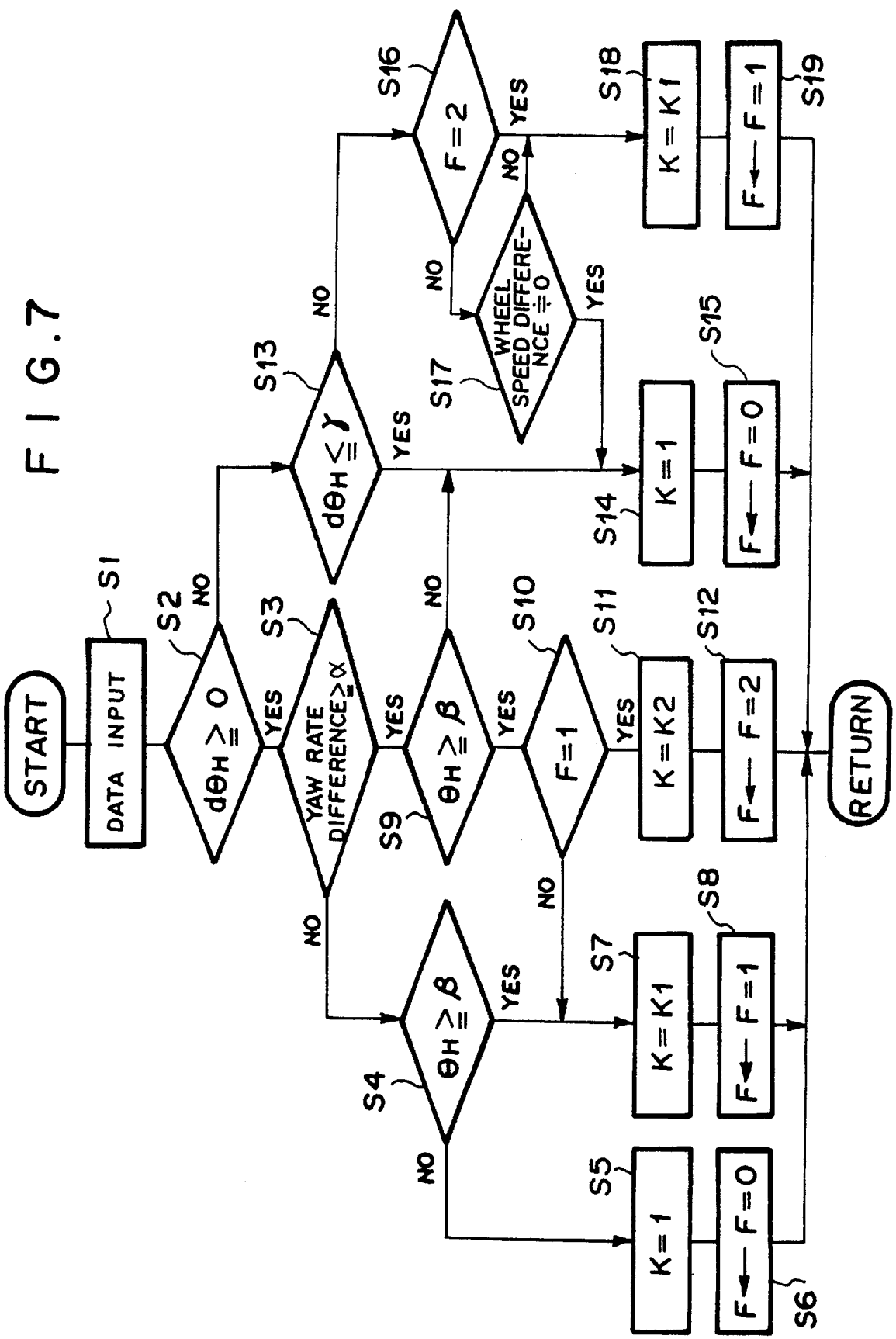
FIG. 7 is a flow chart for illustrating an example of the target-rate-of-slip correction control and the correction limiting control.

In FIG. 7, the slip control means 61 reads various data in step S1 and then determines in step S2 whether the rate of change $d\theta_H$ of the steering wheel turning angle $\theta_H$ is not smaller than 0 (that the rate of change $d\theta_H$ of the steering wheel turning angle $\theta_H$ is not smaller than 0 means that the steering wheel is held stationary or that the steering wheel is being turned left or right). When it is determined that the rate of change $d\theta_H$ of the steering wheel turning angle $\theta_H$ is not smaller than 0, the slip control means 61 determines in step S3 whether the yaw rate difference between the actual yaw rate and the reference yaw rate is not smaller than a predetermined value $\alpha$, i.e., whether the vehicle is in an instable state (in an oversteering state or an understeering state). When it is determined that the yaw rate difference is smaller than the predetermined value $\alpha$, that is, when the vehicle is neither in an oversteering state nor in in an understeering state, the slip control means 61 determines in step S4 whether the steering wheel turning angle $\theta_H$ is not smaller than a predetermined value $\beta$, that is whether the vehicle is making a turn. When it is determined that the steering wheel turning angle $\theta_H$ H is smaller than the predetermined value $\beta$, that is, when the vehicle is running straight, the slip control means 61 sets the coefficient K to 1 in step S5 and sets a flag F to 0 in step S6.

When it is determined in step S4 that the steering wheel turning angle $\theta_H$ is not smaller than the predetermined value $\beta$, that is, when the vehicle is making a turn, the slip control means 61 sets the coefficient K to K1 (0<K1<1) to effect the turning-state-based correction in step S7 and then sets the flag F to 1 in step S8.

When it is determined step S3 that the yaw rate difference is not smaller than the predetermined value $\alpha$, that is, when the vehicle is in an oversteering state or in an understeering state, the slip control means 61 determines in step S9 whether the steering wheel turning angle $\theta_H$ is not smaller than the predetermined value $\beta$, that is whether the vehicle is making a turn. When it is determined that the steering wheel turning angle $\theta_H$ is not smaller than the predetermined value $\beta$, the slip control means 61 determines in step S10 whether the flag F is 1. When it is determined that the flag F is not 1, the slip control means 61 sets the coefficient K to K1 (0<K1<1) to effect the turning-state-based correction in step S7 and then sets the flag F to 1 in step S8. When it is determined in step S10 that the flag F is 1, the slip control means 61 sets the coefficient K to K2 (0<K2<1,K2<K1) to effect the instable-state-based correction in step S11 and sets the flag F to 2. When it is determined in step S9 that the steering wheel turning angle $\theta_H$ is smaller than the predetermined value $\beta$, that is, when the vehicle is running straight, the slip control means 61 sets the coefficient K to 1 in step S14 and then sets the flag F to 0 in step S14.

When it is determined in step S2 that the rate of change $d\theta_H$ of the steering wheel turning angle $\theta_H$ is smaller than 0, that is, when the steering handling is being returned, the slip control means 61 determines in step S13 whether the rate of change $d\theta_H$ of the steering wheel turning angle $\theta_H$ is not smaller than a predetermined value $\gamma(\gamma<0)$. When it is determined that the rate of change $d\theta_H$ of the steering wheel turning angle $\theta_H$ is not smaller than the predetermined value $\gamma(\gamma<0)$, that is, when the steering wheel is being returned at a high speed, the slip control means 61 sets the coefficient K to 1 in step S14 and sets the flag F to 0 in step S15. When it is determined in step S13 that the rate of change $d\theta_H$ of the steering wheel turning angle $\theta_H$ is smaller than the predetermined value $\gamma$, that is, when the steering wheel is being returned at a low speed, the slip control means 61 determines in step S16 whether the flag F is 2. When it is determined that the flag F is 2, that is, when the instable-state-based correction is effected, the slip control means 61 sets the coefficient K to K1 in step S18 and then sets the flag F to 1 in step S19. After the target rates of slip are once returned to the value for the turning-state-based correction, it comes to be determined that the flag F is not 2 in step S16. Accordingly, in the next cycle, the slip control means 61 proceeds to step S17 after step S16 and determines whether the wheel speed difference between the left driven wheel speed and the right driven wheel speed is substantially 0, that is, whether the vehicle is still turning. When it is determined that the vehicle is still turning, the slip control means 61 continues the turning-state-based correction (steps S18 and S19) and when it is determined that the turn is ended, the slip control means 61 sets the coefficient K to 1 in step S14 and then sets the flag F to 0 in step S15.

The slip control means 61 determines in step S21 (FIG. 8) whether the flag F is 2. When it is determined that the flag F is 2, that is, when the instable-state-based correction (the oversteering-state-based correction or the understeering-state-based correction) is being effected, the slip control means 61 determines in step S22 whether the yaw rate difference between the actual yaw rate and the reference yaw rate is not smaller than the predetermined value $\alpha$, that is, whether the vehicle is in an instable state. When it is determined that the yaw rate difference between the actual yaw rate and the reference yaw rate is not smaller than the predetermined value $\alpha$, the slip control means 61 keeps the coefficient K to be 2 (step S23) and keeps the flag F to be 2 (step S24), whereby continuing the instable-state-based correction.

When it is determined in step S21 that the flag F is not 2, that is, when the instable-state-based correction is not effected, the slip control means 61 determines in step S25 whether the steering wheel turning angle $\theta_H$ is not smaller than the predetermined value $\beta$, that is whether the vehicle is making a turn. When it is determined that the steering wheel turning angle $\theta_H$ is not smaller than the predetermined value $\beta$, the slip control means 61 determines in step S22 whether the yaw rate difference between the actual yaw rate and the reference yaw rate is not smaller than the predetermined value $\alpha$, that is, whether the vehicle is in an instable state. When it is determined in step S25 that the steering wheel turning angle $\theta_H$ is smaller than the predetermined value $\beta$, that is, when the vehicle is still running straight, the slip control means 61 sets the coefficient K to 1 in step S26 and sets the flag F to to 0 in step S27.

When it is determined in step S22 that the yaw rate difference between the actual yaw rate and the reference yaw rate is smaller than the predetermined value $\alpha$, the slip control means 61 determines in step S28 whether the steering wheel turning angle $\theta_H$ is not smaller than the predetermined value $\beta$. When it is determined that the steering wheel turning angle $\theta_H$ is smaller than the predetermined value $\beta$, the slip control means 61 sets the coefficient K to 1 in step S26 and sets the flag F to to 0 in step S27.

When it is determined in step S28 that the steering wheel turning angle $\theta_H$ is not smaller than the predetermined value $\beta$, the slip control means 61 sets the coefficient K to K1 to effect the turning-state-based correction in step S29 and sets the flag F to to 1 in step S30.

In this embodiment, since the target rates of slip are reduced by setting the coefficient K to K1 when the steering wheel turning angle $\theta_H$ is not smaller than a predetermined value, running stability during a turn can be ensured. At the same time, since the target rates of slip are further reduced by setting the coefficient K to K2 when the vehicle is in an instable state, i.e., in an oversteering state or an understeering state, where the difference between the actual yaw rate and the reference yaw rate is not smaller than a predetermined value, running stability during a turn can be ensured even if the vehicle comes to an instable state. Further since the oversteering-state-based correction or the understeering-state-based correction is inhibited even if the difference between the actual yaw rate and the reference yaw rate is not smaller than a predetermined value so long as the turning angle of the steering wheel is smaller than a predetermined value, the system can avoid making an unnecessary instable-state-based correction, for instance, when it is misjudged that the vehicle is in an oversteering state or an understeering state while the vehicle is running straight as when one of the driven wheels runs into a ditch or runs onto snow during straight running.

Especially when an actual yaw rate calculating means which calculates the actual yaw rate on the basis of at least the difference between the wheel speeds of the left and right driven wheels and is apt to output a large actual yaw rate, for instance, when one of the driven wheels slips on snow or the like during a straight running is employed as the actual yaw rate detecting means, the problem of misjudgment which results in an unnecessary instable-state-based correction can frequently occur. The arrangement of the embodiment described above can avoid such a problem.

Figure 8:
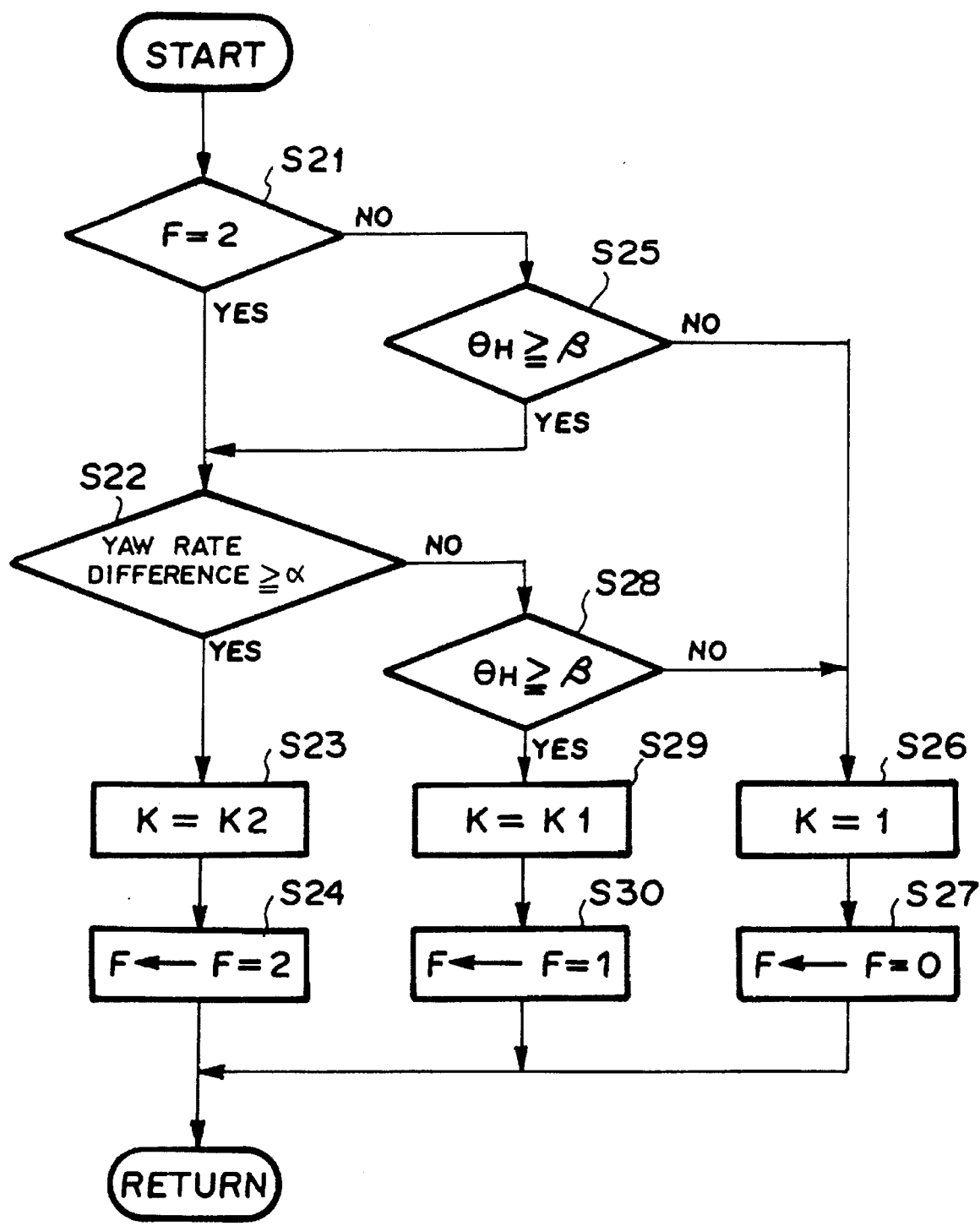
FIG. 8 is a flow chart for illustrating an example of the target-rate-of-slip correction control while the instable-state-based correction is effected.

Further as can be understood from FIG. 8, even if the steering wheel turning angle $\theta_H$ becomes 0 during the oversteering-state-based correction or the understeering-state-based correction, the oversteering-state-based correction or the understeering-state-based correction is not released so long as the difference between the actual yaw rate and the reference yaw rate is not smaller than a predetermined value, and accordingly, the driving force cannot be abruptly increased, for instance, when the steering wheel is in the counter direction during a turning, whereby the running stability is improved.

Further since the correcting means is arranged to return the target rate of slip directly to the value before the turning-state-based correction when the steering wheel is returned toward the neutral position at a rate not lower than a predetermined value with the instable-state-based correction having been made, and to return the same once to the value after the turning-state-based correction when the steering wheel is returned toward the neutral position at a rate lower than the predetermined value with the instable-state-based correction having been made and then to the value before the turning-state-based correction when the vehicle ends the turn, the following results is obtained. That is, when the driver quickly returns the steering wheel, the state of the vehicle is expected to quickly shift from the oversteering state (or the understeering state) and the turning state to the straight running state. Accordingly, by returning the target rate of slip directly to the value before the turning-state-based correction when the steering wheel is returned toward the neutral position at a rate not lower than a predetermined value, the driving force can be quickly increased as soon as the vehicle comes to run straight. On the other hand, when the steering wheel is returned toward the neutral position at a rate lower than the predetermined value, i.e., when the driver returns the steering wheel slowly, the state of the vehicle is expected to be in the turning state for a while though comes out of the oversteering state. In this case, by returning the target rate of slip to the value after the turning-state-based correction and holding the same at the value until the vehicle ends the turn, the running stability during a turn can be ensured and at the same time the driving force can be quickly increased as soon as the vehicle comes to run straight.

Further in the driving control system of the embodiment described above where whether the vehicle ends the turn is detected on the basis of the difference in the wheel speed between the left and right driven wheels, the end of a turn can be more precisely detected than a driving control system where the end of a turn is detected on the basis of the turning angle of the steering wheel since the vehicle can be in a turning state even if the turning angle of the steering wheel is 0 so long as there is a difference in the wheel speed between the left and right driven wheels.

Though, in the embodiment described above, the turning-state-based correction is effected as well as the instable-state-based correction, only the instable-state-based correction may be effected with the turning-state-based correction omitted and the instable-state-based correction may be limited when the turning angle of the steering wheel is smaller than a predetermined value.

Further, the instable-state-based correction need not be completely inhibited when the turning angle of the steering wheel is smaller than the predetermined value but may be limited by reducing the value by which the target rates of slip are reduced by the instable-state-based correction.

The target rate of slip to be corrected need not be limited the target rates of slip for the engine control and the brake control but may be any target rate of slip employed in the traction control. Further only one of the target rates of slip may be corrected.

Though in the embodiment described above, whether the vehicle is in an instable state is determined on the basis of whether the yaw rate difference between the actual yaw rate and the reference yaw rate is not smaller than the predetermined value $\alpha$, whether the vehicle is in an instable state may be determined in various manners.

A modification of the manner of determining whether the vehicle is in an instable state (an oversteering state or an understeering state.) will be described with reference to FIG. 9, hereinbelow.

Figure 9:
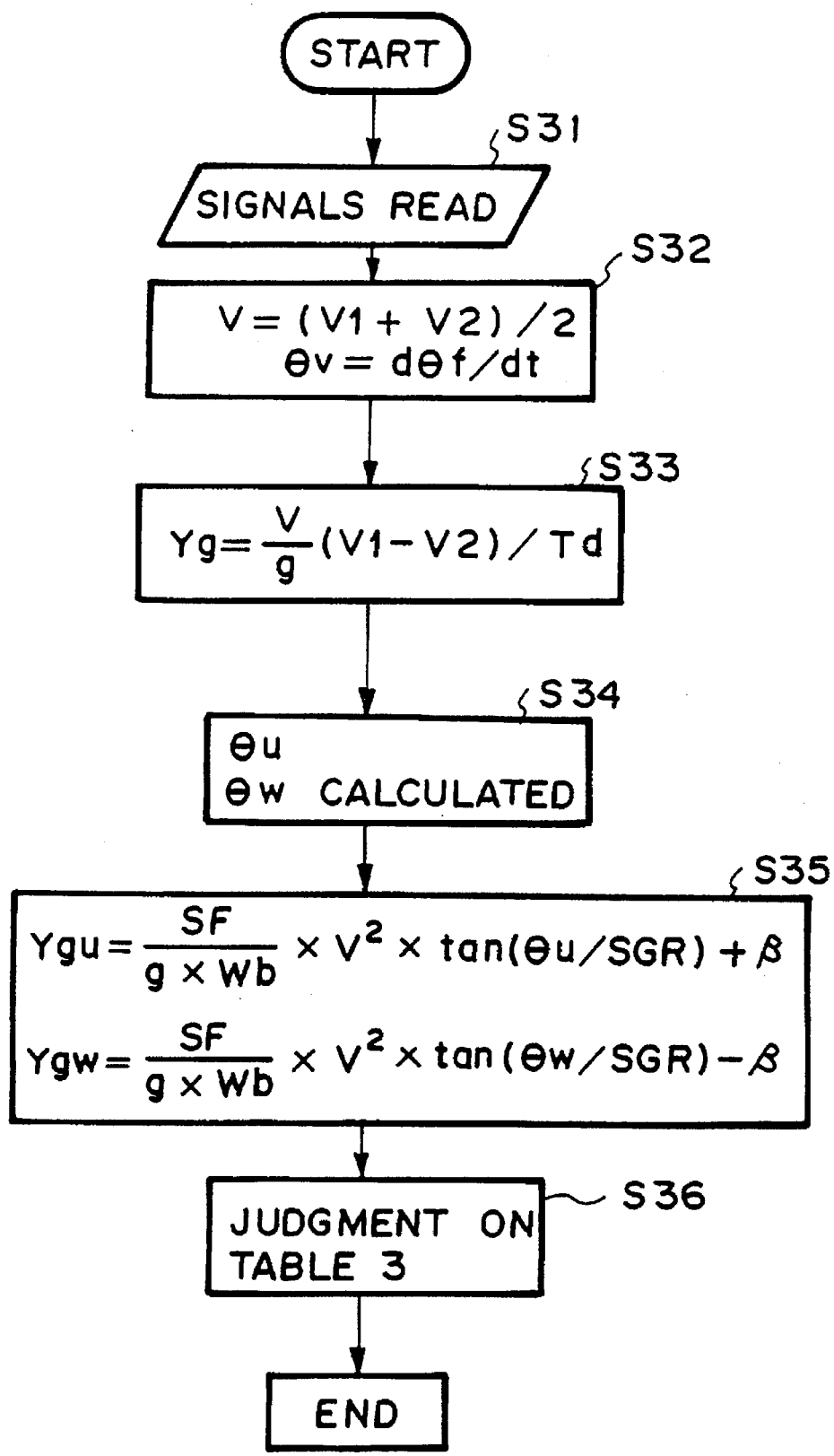
FIG. 9 is a flow chart for illustrating a modification of the manner of determining whether the vehicle is in an instable state.

In FIG. 9, various data are read in step S31. In step S32, the vehicle speed V is determines as the average of the left and right driven wheel speeds V1 and V2 and the steering wheel turning speed $\theta_V$ is calculated by differentiating filtered values $\theta_f$ of detected steering wheel turning angles $\theta$. In this modification, the steering wheel turning angle signal from the steering angle $\theta_H$ sensor is input through an A/D convertor and a filter. Then is step S33, an actual lateral acceleration Yg actually acting on the vehicle body is calculated according to the following formula (4).

$$Yg = K \times (V/g) \times (V1-V2)/Td \qquad (4)$$

wherein Yg=0(or a preset value) when V1×V2=0, K represents a predetermined constant, g=9.8 m/s×s, and Td represents the tread of the vehicle (e.g., 1.7 m). In order to prevent misjudgment due to detection of a wrong actual lateral acceleration Yg when one or both of the left and right driven wheels 1FL and 1FR lock (V1×V2 =0), the actual lateral acceleration Yg is set to 0 when V1×V2=0.

In the formula (4), (V1−V2)/Td corresponds to the actual yaw rate, and the actual lateral acceleration Yg is in G (acceleration of gravity).

In this modification, the yaw rate is converted to the lateral acceleration and the lateral acceleration is employed as a parameter. Since the spin limit yaw rate of the vehicle becomes lower with increase in the vehicle speed, deterioration in accuracy due to shift or the like during the calculating process occurs when the yaw rate is employed as a parameter.

In step S34, a steering wheel turning angle upper limit $\theta u$ and a steering wheel turning angle lower limit $\theta w$ for calculating an upper limit Ygu and a lower limit Ygw of a reference lateral acceleration are calculated according to the following table 5.

TABLE 5

| $\theta v$ | $\theta u$ | $\theta w$ |
|---|---|---|
| $\theta v \geq 0$ | $\theta f + \alpha$ | $\theta f - \alpha - 16\theta v$ |
| $\theta v < 0$ | $\theta f + \alpha - 16\theta v$ | $\theta f - \alpha$ |

That is, when $\theta v \geq 0$, $\theta u = \theta f + \alpha$, $\theta w = \theta f - \alpha - 16\theta v$, and when $\theta v < 0$, $\theta u = \theta f + \alpha - 16\theta v$, $\theta w = \theta f - \alpha$, wherein $\alpha$ is a predetermined small value determined taking into account the detecting error of the steering angle sensor and is for preventing misjudgment.

In the formulae, $-16\theta v$ is for generating an offset for preventing misjudgment due to a delay between operation of the steering wheel and behavior of the vehicle which is caused due to backlash and the like in the gears in the steering system when the sign of the steering wheel turning speed $\theta_V$ is reversed, i.e., when the turning direction of the steering wheel is reversed, and is set with the steering wheel turning speed $\theta_V$ employed as a parameter taking into account the fact that the delay between operation of the steering wheel and behavior of the vehicle becomes greater as the steering wheel turning speed $\theta_V$ increases.

Figure 10:
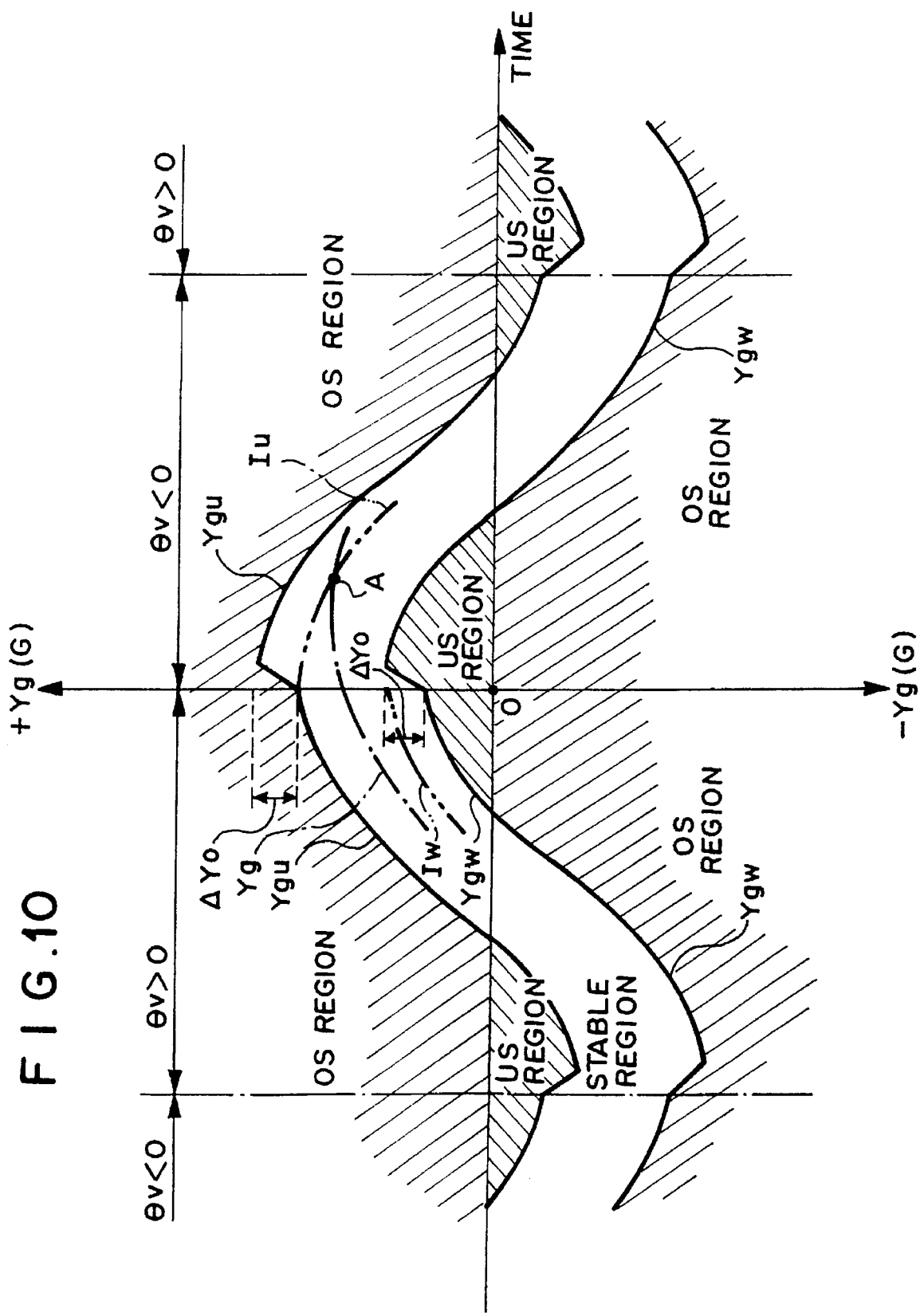
FIG. 10 is a view for illustrating the relation among the actual lateral acceleration, the steering state of the vehicle and the offset.

As shown in FIG. 10, when the sign of the steering wheel turning speed $\theta_V$ is inverted, an offset $\Delta Yo$ based on $-16\theta v$ is set and the delay of behavior of the vehicle can be dealt with.

Then in step S35, the upper limit Ygu and the lower limit Ygw of the reference lateral acceleration are calculated according to the following formulae.

$$Ygu = \{SF/(g \times Wb)\} \times V^2 \times \tan(\theta u/SGR) + \beta$$

$$Ygw = \{SF/(g \times Wb)\} \times V^2 \times \tan(\theta w/SGR) - \beta$$

wherein SF is a stability factor and has been set as shown in the following table 6, SGR is a predetermined steering gear ratio of the vehicle, Wb is a predetermined wheel base of the vehicle, and $\beta$ is a small predetermined value set taking into account errors generated due to various factors.

TABLE 6

| V(Km/h) | SF |
| --- | --- |
| V < 40 | 1.0 |
| 40 ≦ V < 60 | 0.9 |
| 60 ≦ V < 80 | 0.8 |
| 80 ≦ V < 100 | 0.7 |
| 100 ≦ V < 150 | 0.6 |
| 150 ≦ V | 0.5 |

Then in step S36, whether the vehicle is in an oversteering state or in an understeering state is judged on the basis of the actual lateral acceleration Yg, and the upper and lower limits Ygu and Ygw of the reference lateral acceleration according to the logic shown in the following table 7. In table 7, OS represents the oversteering state and the US represents the understeering state.

TABLE 7

| Yg | logic | judgment |
| --- | --- | --- |
| Yg > 0 | Yg > Ygu | OS |
|  | Yg < Ygw | US |
| Yg < 0 | Yg < Ygw | OS |
|  | Yg > Ygu | US |

In table 3, that the actual lateral acceleration Yg is larger than 0 means that a rightward lateral acceleration is actually acting on the vehicle, and that the actual lateral acceleration Yg is smaller than 0 means that a leftward lateral acceleration is actually acting on the vehicle.

As can be understood from table 3 and FIG. 10, when Yg>0, it is determined that the vehicle is in an oversteering state when Yg>Ygu and that the vehicle is in an understeering state when Yg<Ygw while when Yg<0, it is determined that the vehicle is in an oversteering state when Yg<Ygw and that the vehicle is in an understeering state when Yg>Ygu.

FIG. 10 shows the oversteering state region, the understeering state region and the stable state region when the vehicle shifts from a turning where the steering wheel turning speed $θ_V$ is smaller than 0 to a turning where the steering wheel turning speed $θ_V$ is larger than 0 and runs for a predetermined time and then shifts to a turning where the steering wheel turning speed $θ_V$ is smaller than 0 and runs for a predetermined time. The stable state region corresponds to the reference lateral acceleration and has a predetermined width.

In FIG. 10, the offset ΔYo in the region where actual lateral acceleration Yg is larger than 0 corresponds to —16θv(θv<0 accordingly —16θv >0). When the offset ΔYo is not set, the upper and lower limits Ygu and Ygw of the reference lateral acceleration are set as shown by the chained lines Iu and Iw, respectively.

In this case, when the vehicle shifts from a turning where the steering wheel turning speed $θ_V$ is larger than 0 to a turning where the steering wheel turning speed $θ_V$ is smaller than 0, there is caused a delay between the steering operation and the behavior of the vehicle due to delay of the behavior of the vehicle to a turn of the front wheels, and the actual lateral acceleration Yg changes as shown by the chained line, and it is misjudged that the vehicle is in an oversteering state at time A.

However when the offset ΔYo is set so that the upper limit Ygu of the reference lateral acceleration is set by the solid line, such a misjudgment can be surely avoided. It is true of the effect obtained by the offset ΔYo in the region where the actual lateral acceleration Yg is smaller than 0.

As can be understood from FIG. 10, since the offset ΔYo is provided for the upper and lower limits Ygu and Ygw of the reference lateral acceleration only in the region where there is actually caused a delay between the steering operation and the behavior of the vehicle, whether the vehicle is in an oversteering state or in an understeering state can be judged with a high accuracy.

At the same time, since the delay of the behavior of the vehicle to the steering operation increases with increase in the steering wheel turning speed $θ_V$, the offset ΔYo can be optimally set for various steering operation by setting the offset ΔYo on the basis of the steering wheel turning speed $θ_V$.

Further, since the actual lateral acceleration Yg is obtained on the basis of the wheel speeds V1 and V2 of the left and right driven wheels, there is required neither lateral acceleration sensor nor yaw rate sensor which are expensive.

In this modification, the actual lateral acceleration Yg corresponds to said actual value. When the actual lateral acceleration Yg is larger than 0, the upper limit Ygu of the reference lateral acceleration corresponds to the upper limit of the reference value and the lower limit Ygw of the reference lateral acceleration corresponds to the lower limit of the reference value. When the actual lateral acceleration Yg is smaller than 0, the upper limit Ygu of the reference lateral acceleration corresponds to the lower limit of the reference value and the lower limit Ygw of the reference lateral acceleration corresponds to the upper limit of the reference value.

In this modification, the yaw rate ψv (an actual yaw rate and a reference yaw rate) may be employed as the parameter instead of the lateral acceleration. In this case, the actual yaw rate ψv, and the upper and lower limits ψvu and ψvw are calculated according to the following formulae.

$$ψv=(V1-V2)/Td$$

$$ψvu=(SF/Wb)×V×\tan(θu/SGR)+β$$

$$ψvw=(SF/Wb)×V×\tan(θw/SGR)+β$$

Another modification of the manner of determining whether the vehicle is in an instable state will be described with reference to FIG. 11, hereinbelow.

Figure 11:
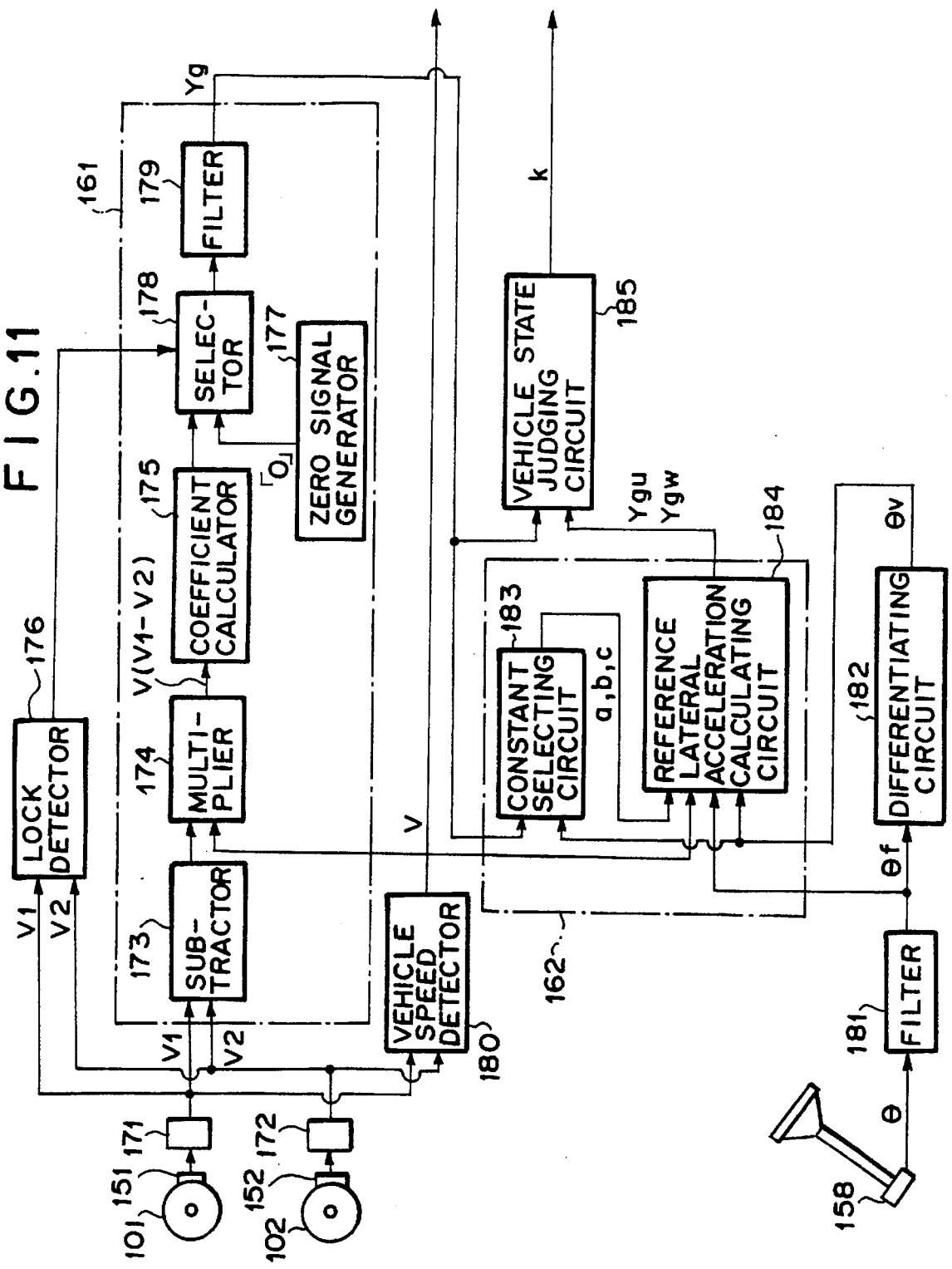
FIG. 11 is a view of a system which carries out another modification of the manner of determining whether the vehicle is in an instable state.

In FIG. 11, a vehicle state judging system includes a lateral acceleration detecting section 161 and a reference lateral acceleration calculating section 162. The detecting signal of a wheel speed sensor 151 for the left front wheel 101 is converted to V1 by a wheel speed convertor 171 and input into a subtracter 73, a vehicle speed detector 180 and a lock detector 176. The detecting signal of a wheel speed sensor 152 for the right front wheel 102 is converted to V2 by a wheel speed convertor 172 and input into the subtracter 73, the vehicle speed detector 180 and the lock detector 176. The vehicle speed detector 180 calculates and outputs the vehicle speed V=(V1+V2)/2 and the subtracter 173 calculates and outputs the wheel speed difference (V1−V2). A multiplier 174 calculates the product of the vehicle speed V and the wheel speed difference (V1−V2) and outputs the value of V(V1−V2). A coefficient calculator 175 multiplies V(V1−V2) by K/(g×Td) (a coefficient) and calculates the actual lateral acceleration Yg.

The lock detector 176 determines whether V1×V2=0, that is, whether one or both of the left and right front wheels has locked. When it is determined that V1×V2 is not 0, the lock detector 176 outputs no command to a selector 178. When it is determined that V1×V2 is 0, the lock detector 176 outputs a command to the selector 178 to take signal "0" from a zero signal generator 177.

That is, the selector 178 selects one of the signals from the coefficient calculator 175 and the zero signal generator 177.

When it is determined that neither of the left and right front wheels has locked, the actual lateral acceleration Yg is input into a filter 179 through the selector 178, and an actual lateral acceleration signal removed with noise in the filter 179 is output to a constant selecting circuit 183.

A signal representing the steering wheel turning angle θ detected by a steering angle sensor 158 is converted to θf by removing noise in a filter 181 and then inputs into a differentiating circuit 182 and a reference lateral acceleration calculating circuit 184. The differentiating circuit 182 differentiates θf and inputs a steering wheel turning speed $θ_v$ to the reference lateral acceleration calculating circuit 184.

The constant selecting circuit 183 sets constants a,b c and for calculating the upper limit $θ_u$ of the steering wheel turning angle and constants a, b and c for calculating the lower limit $θ_w$ of the steering wheel turning angle according to the following table 8 on the basis of the actual lateral acceleration Yg and the steering wheel turning speed $θ_v$ and inputs them to the reference lateral acceleration calculating circuit 184.

TABLE 8

| Yg | θv | a | b | c | |
|---|---|---|---|---|---|
| Yg > 0 | θv ≧ 0 | 0 | α | β | for |
|  | θv < 0 | −16 | α | β | $θ_u$ |
| Yg < 0 | θv ≧ 0 | −16 | −α | −β | for |
|  | θv < 0 | 0 | −α | −β | $θ_w$ |

The reference lateral acceleration calculating circuit 184 calculates the upper and lower limits $θ_u$ and $θ_w$ of the steering wheel turning angle θf and the upper and lower limits of the reference lateral acceleration on the basis of the vehicle speed V, the constants a, b and c, the steering wheel turning angle θf and other constants (SF, g, Wb, SGR) stored therein in the following manner and inputs them to a vehicle state judging circuit 185.

$θ_u = θf + a × θv + b$ $θ_w = θf + a × θv + b$ $Ygu = \{SF/(g × Wb)\} × V^2 \mathrm{xtan}(θ_u/SGR) + c$ $Ygu = \{SF/(g × Wb)\} × V^2 \mathrm{xtan}(θ_w/SGR) + c$ Then the vehicle state judging circuit 185 judges whether the vehicle is in an oversteering state or in an understeering state on the basis of the actual lateral acceleration Yg, and the upper and lower limits Ygu and Ygw of the reference lateral acceleration according to the logic shown in the table 7.

Figure 12:
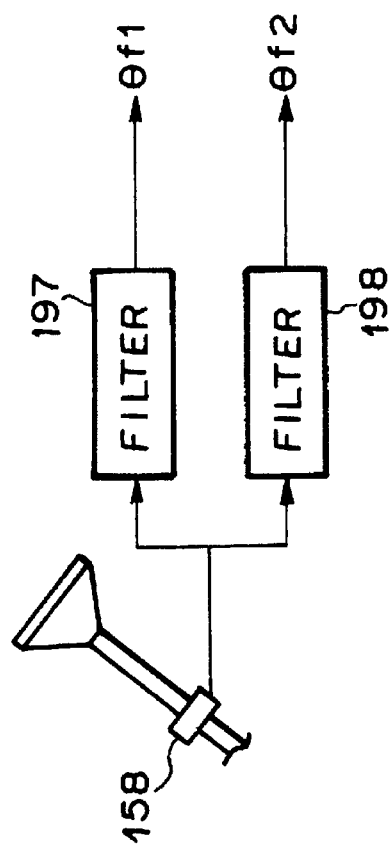
FIG. 12 is a fragmentary view for illustrating still another modification of the manner of determining whether the vehicle is in an instable state.

Still another modification of the manner of determining whether the vehicle is in an instable state will be described with reference to FIGS. 12 to 14, hereinbelow.

In this modification, the actual lateral acceleration Yg actually acting on the vehicle body is calculated according to the following formula as in the first modification.

$Yg = K × (V/g) × (V1 − V2)/Td$

In this modification, the steering wheel turning angle θ as detected by the steering angle sensor 158 is input into a pair of filters 197 and 198 having different filer properties in order to remove noise and to dull the value of the steering wheel turning angle θ. Then the reference lateral acceleration is calculated on the basis of the filtered values θf1 and θf2 of the steering wheel turning angle θ output from the filters 197 and 198 in the following manner.

Figure 13:
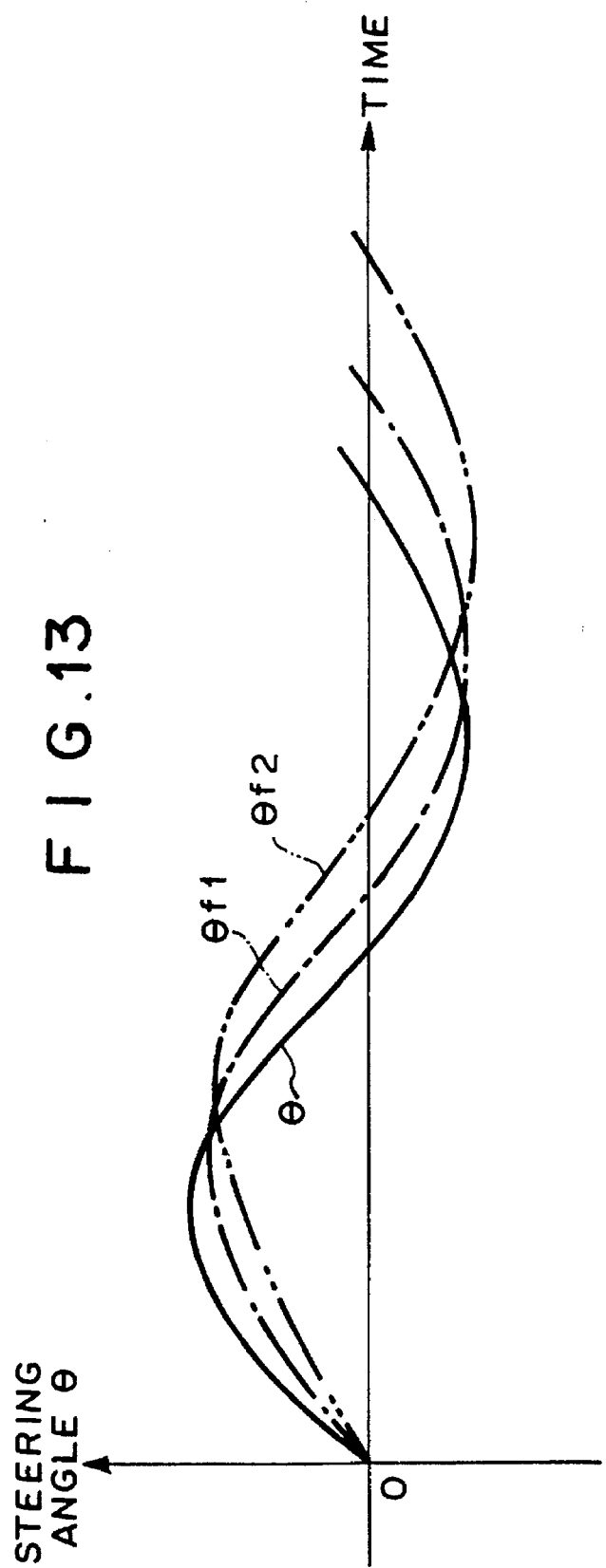
FIG. 13 is a view showing the change in the detected steering wheel turning angle $\theta$ and the filtered steering wheel turning angles $\theta f1$ and $\theta f2$.

Since the filters 197 and 198 have different filter properties and the filtered steering wheel turning angle θf2 is more dulled than the filtered steering wheel turning angle θf1, the steering wheel turning angle θ as detected by the steering angle sensor 158 and the filtered steering wheel turning angles θf1 and θf2 change, for instance, as shown in FIG. 13.

Then a pair of upper limits Ygu1 and Ygu2 and a pair of lower limit Ygw1 and Ygw2 of the reference lateral acceleration are calculated according to the following formulae.

$Ygu1 = \{SF/(g × Wb)\} × V^2 \mathrm{xtan}\{(θf1 + α)/SGR\} + β$ $Ygu1 = \{SF/(g × Wb)\} × V^2 \mathrm{xtan}\{(θf1 − α)/SGR\} − β$ $Ygu2 = \{SF/(g × Wb)\} × V^2 \mathrm{xtan}\{(θf2 + α)/SGR\} + β$ $Ygw2 = \{SF/(g × Wb)\} × V^2 \mathrm{xtan}\{(θf2 − α)/SGR\} − β$ Then whether the vehicle is in an oversteering state or in an understeering state is judged on the basis of the actual lateral acceleration Yg, and the upper and lower limits Ygu1, Ygu2, Ygw1 and Ygw2 of the reference lateral acceleration according to the following table 9. In table 9, OS represents the oversteering state and the US represents the understeering state.

TABLE 9

| Yg | logic | | judgment |
|---|---|---|---|
| Yg > 0 | Yg > Ygu1 | Yg > Ygu2 | OS |
|  | Yg < Ygw1 | Yg < Ygw2 | US |
| Yg < 0 | Yg < Ygw1 | Yg < Ygw2 | OS |
|  | Yg > Ygu1 | Yg > Ygu2 | US |

Figure 14:
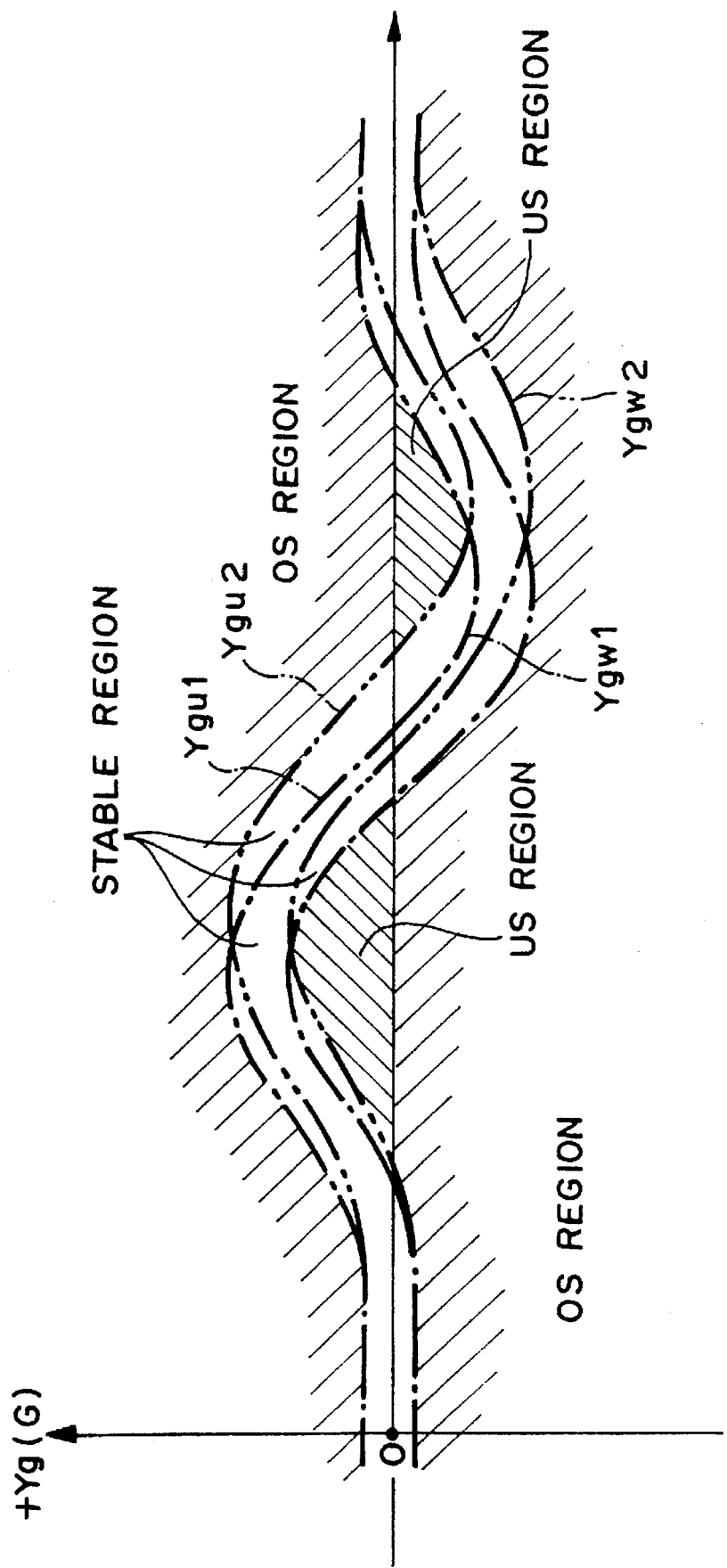
FIG. 14 is a view for illustrating the relation among the actual lateral acceleration, the steering state of the vehicle and the offset in the modification.

That is, as shown in table 9 and FIG. 14, when Yg>0, it is determined that the vehicle is in an oversteering state when Yg is larger than the both of Ygu1 and Ygu2 and that the vehicle is in an understeering state when Yg is smaller than the both of Ygw1 and Ygw2. When Yg<0, it is determined that the vehicle is in an oversteering state when Yg is larger than the both of Ygw1 and Ygw2 and that the vehicle is in an understeering state when Yg is smaller than the both of Ygu1 and Ygu2.

When the filter properties of the filters 197 and 198 are properly selected, the vehicle state can be judged by calculating a synthetic reference lateral acceleration (corresponding to the stable region in FIG. 14) which is the logical sum of the reference lateral accelerations respectively defined by the upper and lower limits pairs Ygu1 and Ygw1 and Ygu2 and Ygw2, and comparing the actual lateral acceleration Yg with the synthetic reference lateral acceleration.

In this modification, the synthetic reference lateral acceleration is calculated on the basis of the vehicle speed V and the filtered steering wheel turning angles θf1 and θf2 obtained by processing the steering wheel turning angle θ as detected by the steering angle sensor 158 with the filters 197 and 198 whose filter properties are properly selected, and the steering state of the vehicle is judged on the basis of the synthetic reference lateral acceleration thus calculated and the actual lateral acceleration Yg obtained on the basis of the vehicle speed V and the left and right driven wheel speeds V1 and V2. Accordingly processing of the signals and the calculations are greatly simplified.

What is claimed is:

1. A traction control system for a vehicle which reduces a rate of slip of driving wheels of the vehicle by reducing the driving force transmitted to the road surface from the driving wheels when the driving wheels slip, wherein the improvement comprises a turning state judging means which judges whether the vehicle is making a turn, an instable state judging means which judges whether the vehicle is in an instable state which occurs when the vehicle is making a turn, and a torque control means which reduces the driving force by a higher rate when the driving wheels slip while the vehicle is making a turn than when the driving wheels slip while the vehicle is running straight, and reduces the driving force by a higher rate when the driving wheels slip while the vehicle is in an instable state and the vehicle making a turn than when the driving wheels slip while the vehicle is not in an instable state and the vehicle is not making a turn and actuation of the driving force reduction is restrained when the vehicle is judged to be in an instable state while the vehicle is judged to be running straight and the reduction of the driving force is not effected, and the driving force reduction is continued when the vehicle is judged to be running straight while the vehicle is judged to be in an instable state and the reduction of the driving force is being effected.

2. A traction control system as defined in claim 1 which further comprises a steering angle detecting means which detects the turning angle of the steering wheel, a reference yaw rate calculating means which calculates a reference yaw rate acting on the vehicle on the basis of the turning angle of the steering wheel detected by the steering angle detecting means, and an actual yaw rate detecting means which detects an actual yaw rate actually acting on the vehicle and in which said turning state judging means judges that the vehicle is making a turn when the turning angle of the steering wheel detected by the steering angle detecting means is not smaller than a predetermined value while said instable state judging means judges that the vehicle is in an instable state when the difference between the actual yaw rate and the reference yaw rate is not smaller than a predetermined value.

3. A traction control system as defined in claim 2 in which said torque control means is arranged not to shift to the driving force control for the instable state of the vehicle, which is effected when the vehicle is in an instable state, so long as the turning angle of the steering wheel is smaller than a predetermined value even if the instable state judging means judges that the vehicle is in an instable state.

4. A traction control system as defined in claim 2 in which said torque control means is arranged to continue the driving force control for the instable state of the vehicle, which is effected when the vehicle is in an instable state and making a turn, so long as the difference between the actual yaw rate and the reference yaw rate is not smaller than a predetermined value.

5. A traction control system as defined in claim 1 in which said torque control means is arranged to set a threshold value of the rate of slip of the driving wheels over which it initiates reduction of the driving force to be smaller when the vehicle is in an instable state than when the vehicle is making a turn which is smaller than when the vehicle is running straight.

6. A traction control system as defined in claim 1 in which said torque control means is arranged to effect the driving force control for the instable state of the vehicle, which is effected when the vehicle is in an instable state and making a turn, after effecting the driving force control for turning, which is to be effected when the vehicle is making a turn.

7. A traction control system as defined in claim 1 in which said instable state judging means judges whether the vehicle is in an instable state by comparing a reference value of the yaw rate or the lateral acceleration which is set according to the turning condition of the vehicle with an actual value of the yaw rate or the lateral acceleration actually acting on the vehicle and said reference value includes an offset which is set in order to compensate for a delay of the behavior of the vehicle to operation of the steering wheel which is caused when the steering wheel is turned in the reverse direction.

8. A traction control system as defined in claim 7 in which said reference value includes upper and lower limits.

9. A traction control system as defined in claim 7 in which said offset is set on the basis of the steering wheel turning speed so that the offset increases with increase in the steering wheel turning speed.

10. A traction control system as defined in claim 8 in which said instable state judging means judges that the vehicle is in an oversteering state when the actual values is larger than the upper limit of the reference value and that the vehicle is in an understeering state when the actual values is smaller than the lower limit of the reference value.

11. A traction control system as defined in claim 7 in which said actual value is obtained on the basis of the wheel speeds of the left and right driven wheels of the vehicle.

12. A traction control system as defined in claim 11 in which said actual value is fixed to a small predetermined value when at least one of the driven wheels locks.

13. A traction control system as defined in claim 1 in which said instable state judging means judges whether the vehicle is in an instable state by comparing a reference value of the yaw rate or the lateral acceleration which is set according to the turning condition of the vehicle with an actual value of the yaw rate or the lateral acceleration actually acting on the vehicle wherein the instable state judging means calculates a plurality of the reference values on the basis of the vehicle speed and a plurality of filtered values of the steering wheel turning angle obtained by processing a steering wheel turning angle signal from a steering angle sensor by a plurality filters having different filter values, the reference values being arranged between upper and lower limits and each having a predetermined width, calculates a synthetic reference value which is the logical sum of the reference values, and judges whether the vehicle is in an oversteering state or in an understeering state on the basis of the actual value and the synthetic reference value.

14. A traction control system as defined in claim 13 in which said instable state judging means judges that the the vehicle is in an oversteering state when the actual value is larger than the synthetic reference value and is in an understeering state when the former is smaller than the latter.

15. A traction control system for a vehicle which controls a rate of slip of the driving wheels relative to the road surface on the basis of a target rate of slip comprising a steering angle detecting means which detects the turning angle of a steering wheel of the vehicle, an actual yaw rate detecting means which detects an actual yaw rate actually acting on the vehicle, a reference yaw rate calculating means which calculates a reference yaw rate which is acting on the vehicle, a correcting means which makes an instable-state-based correction to reduce the target rate of slip by a first value when the vehicle is in an instable state where the difference between the actual yaw rate and the reference yaw rate is not smaller than a predetermined value, and a correction limiting means which prevents the correcting means from making the instablestate-based correction when the turning angle of the steering wheel is smaller than a predetermined value even if the difference between the actual yaw rate and the reference yaw rate is not smaller than the predetermined value.

16. A traction control system as defined in claim 15 in which said actual yaw rate detecting means calculates the actual yaw rate on the basis of at least a vehicle speed detected by a vehicle speed sensor and difference between the wheel speeds of the left and right driven wheels detected by wheel speed sensors.

17. A traction control system as defined in claim 15 in which correcting means is arranged to make a turning-state-based correction to reduce the target rate of slip by a second value smaller than said first value when the vehicle is making a turn.

18. A traction control system as defined in claim 17 in which the correction limiting means is arranged to permit the correcting means to make the instable-state-based correction only after the turning- state-based correction.

19. A traction control system as defined in claim 18 in which said correcting means is arranged to return the target rate of slip directly to a value before the turning-state-based correction when the steering wheel is returned toward a neutral position at a rate not lower than a predetermined value with the instable-state-based correction having been made, and to return the target rate of slip to a value after the turning-state-based correction when the steering wheel is returned toward the neutral position at a rate lower than a predetermined value with the instable-state-based correction having been made and then to the value before the turning-state-based correction when the vehicle ends the turn.

20. A traction control system as defined in claim 19 in which whether the vehicle ends the turn is detected on the basis of the difference in the wheel speed between the left and right driven wheels.

* * * * *